United States Patent [19]

DeAguiar et al.

[11] Patent Number: 5,101,436

[45] Date of Patent: Mar. 31, 1992

[54] HYBRID IMAGE EDITOR

[75] Inventors: John R. DeAguiar, Sebastopol; Hal C. Lonas, Jr., San Diego, both of Calif.

[73] Assignee: Optigraphics Corporation, San Diego, Calif.

[21] Appl. No.: 522,513

[22] Filed: May 11, 1990

[51] Int. Cl.⁵ .......................... G06K 9/00; G09G 1/02
[52] U.S. Cl. ........................................ 382/1; 382/41; 340/798; 395/133
[58] Field of Search ........................ 382/1, 41, 22, 21; 340/798-799; 364/518

[56] References Cited

U.S. PATENT DOCUMENTS

| | | | |
|---|---|---|---|
| 4,307,377 | 12/1981 | Pferd et al. | 382/21 |
| 4,630,309 | 12/1986 | Karow | 382/56 |
| 4,677,573 | 6/1987 | Brown et al. | 364/521 |
| 4,777,651 | 10/1988 | McCann et al. | 382/21 |
| 4,808,988 | 2/1989 | Burke et al. | 340/744 |
| 4,817,187 | 3/1989 | Lien | 382/56 |

OTHER PUBLICATIONS

Silicon Beach Software, "Graphics and Utility Programs-SuperPaint" brochure, 2 pages 7/28/87, San Diego, Ca.
Silicon Beach Software, "Graphics Software SuperPaint" brochure, 2 pages, (date unknown), San Diego, Calif.
Silicon Beach Software, "SuperCard" brochure, 2 pages, (date unknown), San Diego, Calif.
Silicon Beach Software, "Personal Press" brochure, 2 pages, (date unknown), San Diego, Calif.
Silicon Beach Software, "Super 3D" brochure, 3 pages, (date unknown), San Diego, Calif.
Silicon Beach Software, "Superpaint 2.0, Setting the Standard. Again.", 2 pages, (date unknown) San Diego, Calif.
Silicon Beach Software, "Develop Your Ideas in Digital Darkroom", 2 pages, (date unknown), San Diego, Calif.

Clay Andres, "User-Defined Painting Tools Push Mac Color", MacWeek, vol. 3, Issue 42, p. 63, 11/21/89.
Randy Barrett, "NOAA Packs Macs to Track Oil Spill: Technicians Used IIcxes, Supercard" MacWeek, vol. 3, Issue 3, p. 14, 9/1989.
Laurie Wigham, "Best for Basics", Publish, vol. 4, Issue 8, p. 85, 8/89.
Erfert Fenton, "SuperPaint.2.0", Macworld, vol. 6, Issue 8, p. 168, 8/89.
Steve McKinstry, "Draw, Pardner", Macworld, vol. 6, Issue 8, p. 140, 8/89.
Tom Thompson, "Industrial-Strength Graphics", Byte, vol. 14, Issue 6, p. 219, 6/89.
Carlos Martinez, "SuperPaint 2.0", MacUser, vol. 25, Issue 7, p. 50, 7/89.
Silicon Beach Software, Inc., "SuperPaint Bundled with MS Word, File", MacWeek, vol. 2, Issue 39, p. 6, 9/27/88.
Clay Andres, "Tools of the Drawing Trade", MacWeek, vol. 2, Issue 31, p. 44, 8/2/88.
Adrian Mello, "Paint Roundup", MacWorld, vol. 5, Issue 9, p. 150, 9/88.
Keith Thompson, "SuperPaint", InfoWorld, vol. 10, Issue 24, p. 14, 6/13/88.
Jim Forbes, "Mac Releases Put Heat on Microsoft to Boost New Word", PC Week, vol. 5, Issue 18, p. 6, 5/3/88.
Silicon Beach Software, Inc. "Silicon Beach Introduces Image-Processing Pack, Upgrades", Computer Reseller News, Issue 245, p. 85, 2/8/88.

(List continued on next page.)

Primary Examiner—Leo H. Boudreau
Attorney, Agent, or Firm—Knobbe, Martens, Olson & Bear

[57] ABSTRACT

A hybrid image editor for editing raster and vector entities with a common set of vector edit operations. Raster and vector entities are stored in a single image layer. Raster entities are selectively converted to vector entities. Converted entities are selectively erased from an image comprising multiple, overlapping raster entities.

23 Claims, 27 Drawing Sheets

OTHER PUBLICATIONS

Robert C. Eckhardt, "Paint Jobs: Testing the Limits of Four Macintosh Paint Programs", Publish, vol. 2, Issue 2, p. 76, 3/87.

Carlos Domingo Martinez, "A Tale of Two Palettes", MacUser, vol. 3, Issue 9, p. 156, 9/87.

Erik Sandberg-Diment, "A Faster Way with SuperPaint", New York Times, vol. 136, Issue 47, 130, p. 25, 5/5/87.

Michael Antebi, "Software Ends Paint, Draw Features for a Bargain Price", InfoWorld, vol. 9, Issue 15, p. 56, 4/13/87.

Juli Cortino, "Artists, Animators Attracted by New Graphics Technology", MIS Week, vol. 7, Issue, 8, p. 23, 2/24/86.

Connie Guglielmo, "Superpaint Upgrade Finally Ships: Includes Bezier Tools, AutoTrace", MacWeek, vol. 3, Issue 4, p. 6, 1/24/89.

Dennis Klatzkin, "SuperPaint 2.0: Is It Still Super?", MacWeek, vol. 3, Issue 17, p. 96, Apr. 25, 1989.

Salvatore Parascandolo, "Graphically Speaking", MacUser, vol. 5, Issue 1, p. 233, 1/89.

Jiri Weiss, "The Mac's Just Half of the Equation", vol. 2, Issue 36, p. 26, Sep. 6, 1988.

FIND NEAREST RASTER BLOB

RECOGNIZE SHAPE OF BLOB

GENERALIZED EDGE FOLLOWING

EDGE POINT PROCESSING

INTERSECTION CROSSING

ANALYZE NEW INTERSECTION SLICE

ANALYZE TRACE RECORDS

ERASE ENTITY FROM RASTER IMAGE

SAMPLE INTERSECTION

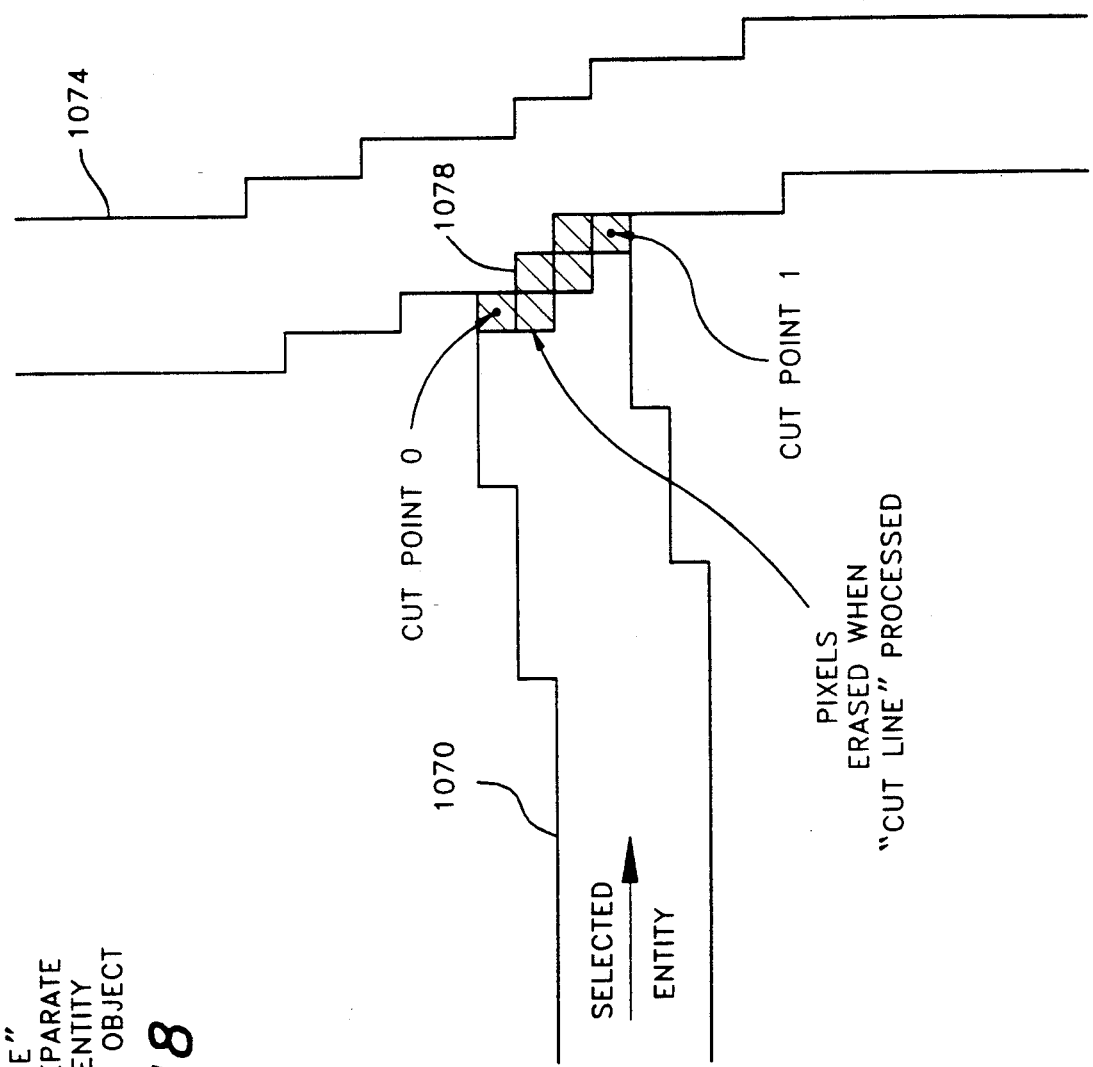

ated with misidentifying pieces of other entities as belonging to a selected entity if the process of entity recognition was guided by some predetermined geometric shape. It would also be a significant advantage if, after a selected entity was recognized and converted, the selected raster entity could be erased from among other overlapping raster entities such that the integrity of the other raster entities was maintained.

HYBRID IMAGE EDITOR

MICROFICHE APPENDIX

A microfiche appendix is included as a part of this specification. The microfiche appendix comprises 92 frames on one (1) sheet of microfiche.

BACKGROUND OF THE INVENTION

1. Field of the Invention

The present invention relates to computer aided design ("CAD") systems and, more particularly, to the concurrent editing of raster and vector entities in a single image layer, and the selective conversion and erasure of raster entities.

2. The Prior Art

The present invention comprises an improved image editor of the type used for computer aided design and drafting ("CADD"), more commonly known as computer aided design ("CAD"). One type of image editor, a raster editor, is oftentimes used to make changes to a preexisting hardcopy drawing that is scanned into a computer as a digital image. Due to their simplicity of engineering, document scanners that digitize hardcopy drawings are typically rasterizing devices and, thus, most preexisting drawings are raster images that must be modified with a raster editor. Raster images are made up of a matrix of individually addressable pixels, which are ultimately represented inside of a computer as bit-maps. These digitized images include geometric shapes, or entities, such as polygons, that can be manipulated by the user of the raster editor.

An image editor will typically edit digitized entities that are represented and stored in a file in only one of two different formats, known as raster and vector. For example, one entity of a raster image may be a circle. A circle is described in raster format by the set of individual pixels around the circumference of the circle, where each pixel is identified by an x-y coordinate. The same circle described in vector format is stored in memory as the tuple comprising the center of the circle (an x-y coordinate) and the radius of the circle.

Vector editors are typically used to create and edit digital images where no preexisting hardcopy drawing must be modified since it is well known that manipulations on vector entities, such as "scale" and "move", will be far less computationally intensive than manipulations on the same entity in a raster format. Furthermore, a clear advantage in memory usage results when digitized entities are stored in vector format since the individual pixels of an entity do not have to be stored.

For some time now, a need has existed for converting raster entities into vector entities to take advantage of the more powerful and less time-consuming editing operations that are commonly associated with vector editors. Pferd, et al., (U.S. Pat. No. 4,307,377), was an early attempt at converting raster images into vector images. The patent discloses a vector coding technique to extract vector information in real-time from raster-type data scanned line-by-line. As part of a pre-processing function the technique fills in line gaps which are found in the graphics information. After pre-processing, a pair of adjacent scan lines are monitored for indications of edge-to-edge transitions and they are compared in position and slope for continuations of line lengths. Line vectors are thus created and stored as two sets of rectangular coordinates and a number representing a line thickness. Pferd, et al., does not address complex entity conversion such as the conversion of arcs and polylines. Nor does the patent disclose conversion of overlapping entities or entities that have been "recognized" according to a predetermined entity template.

More recently, patents to McCann, et al. and Lien disclose other means for converting raster data into vector data. The system shown in McCann, et al. (U.S. Pat. No. 4,777,651) converts raster scan data into a list of vectors which can be edited, displayed and stored. It is therein suggested that the database of vectors can be used for syntactic pattern recognition such as identifying arcs, characters or other features. The rasterized bit-map which is input to the system is segmented into a series of windows, and neighborhood logic elements perform transformation operations such as growing, smoothing and thinning. Line segments are "chain coded" in lists and then converted to the final output vectors.

Lien (U.S. Pat. No. 4,817,187) shows a vectorizer for hand drawn technical drawings that have been digitized. The vectors are created by serially scanning "run length" data. Run length data is accumulated into records defining a "basic shape", such as an arc vector, line vector or filled shape. An object, as defined by the Lien Patent, comprises a number of connected basic shapes which are referred to as either "trapezoids" comprising four corner points or "blobs", defined as non-trapezoidal polygons. According to the Lien disclosure, the technique identifies arc vectors, line vectors and filled shapes.

While the above-identified patents disclose various techniques for converting a raster image into a vector image, none of them address the issues of "selective" conversion and "selective" erasure. If the goal is to make modifications to existing raster images, it would be a more efficient and accurate process to only choose selected entities of the image to vectorize. In most applications, the majority of the raster image seldom needs to be modified, so in most cases it is not wise to expend time converting an entire raster image. In addition, one would expect that where entities overlap one another as is often the case, there would be fewer problems associated with misidentifying pieces of other entities as belonging to a selected entity if the process of entity recognition was guided by some predetermined geometric shape. It would also be a significant advantage if, after a selected entity was recognized and converted, the selected raster entity could be erased from among other overlapping raster entities such that the integrity of the other raster entities was maintained.

Other known systems in the prior art allow raster and vector entities to be edited with a single computer program. However, these systems treat raster and vector entities as distinct image layers and, as a result, entirely different edit operations must be used to manipulate the raster and vector entities. Thus, in such systems the user must be consciously aware of the internal representation of the entity being edited so that the appropriate raster or vector edit operations can be selected.

Consequently, a need exists for an image editing system which is characterized by entity directed vectorization, overlapping entity vectorization and erasure, and editing of coexisting raster and vector entities in the same image layer.

SUMMARY OF THE INVENTION

The present invention provides a hybrid image editor designed to satisfy the aforementioned needs. The hybrid image editor is used to edit raster and vector entities with a common set of vector edit operations so that the user perceives no differences between the two types of entities. The hybrid image editor accomplishes this "seamless" effect by providing functions for the selective conversion of raster entities into vector entities and, thereafter, the selective erasure of such vectorized entities.

In one aspect of the invention, a prestored raster image is read into the editor from memory and thereafter displayed on a visual display device. From a menu listing types of geometric entities, such as line, polyline, circular arc and elliptical arc, a user selects a geometric entity corresponding to a raster entity that is to be selectively converted. The raster entity is selected from the raster image by "picking" the entity from the visual display with a mouse The selected raster entity is vectorized, with both of the entities (raster and vector) then being displayed to the user. The user then has the option of deleting the raster entity before manipulating the vectorized entity. At this point, the vectorized entity is a part of the raster display image and the user views the vectorized entity as if it was a newly created vector entity. This effect is accomplished by coordinating a raster entity databse and vector entity database so as to provide a single image layer. Thus, the user can manipulate the vectorized entity using a set of standard vector edit operations, including operations such as move, scale and rotate. After the vectorized entity has been modified, the user can save the edited vectorized entity in a revised version of the raster image by converting the vector entity back to raster format.

More specifically, the selective conversion function of the editor first ensures that a raster entity exists near the pick location input with the mouse. As the next step, the conversion process identifies a locally line-like segment on the raster entity. The line-like segment is extended at both ends, fitting gathered edge points to a parameterized form of the canonical equation corresponding to the geometric entity selected by the user. An end is extended by gathering edge pixels on both edges of the raster entity using a pair of optimal edge followers known as the clockwise and counterclockwise edge followers. The edge followers are state machines, one for each edge, that follow entity edges by searching for "on-off" pixel transitions. The path of the raster entity is efficiently saved in memory by averaging edge points into so-called survey points and then discarding the gathered edge pixels. Extension occurs until a "deviation", such as an intersecting entity, a pixel gap or a bend, is identified. The editor then attempts to continue the extension across the deviation. Extrapolated edge points are hypothesized across the deviation and the edges are thus followed beyond the deviation, if possible. The conversion process terminates when both ends can no longer be extended.

The hybrid image editor also provides a function for selectively erasing the vectorized entity. That is, where a raster entity overlaps the vector entity, pixels of the vector entity are made to be distinct from the raster entity by careful separation or "cutting" between the entities. The area of entity overlap is designated by an intersection zone which is created by forming a quadrilateral boundary around the intersection. The boundary of the intersection zone is defined by intersection "entrance" and "exit" lines and a pair of "flare limit" lines. The naming convention of entrance and exit is chosen from the perspective of the edge followers proceeding through the intersection.

Flares are groups of pixels that extend in a normal direction away from the direction of an edge of the raster entity and thereby identify an intersecting entity. Flare limit lines roughly parallel the edges of the raster entity. Pixels extending beyond the flare limit lines of the selected entity, and normal thereto, are identified as a flare. The erasure process begins erasing by setting all the pixels in the intersection zone to the background color of the visual display. Then, for each flare, lines are extrapolated across the vectorized entity inside the intersection zone. Extrapolation lines on either side of the vector entity are correlated, and the bounds of the intersecting raster entity are filled by setting the color of the pixels in the area between the extrapolation lines to the same color as the intersecting raster entity.

Thus, the hybrid image editor of the present invention provides a means for editing raster and vector entities that coexist in a single image layer. The hybrid image editor also incorporates a means for entity directed vectorization, called selective conversion, and a means for selectively erasing overlapping entities.

These and other objects and features of the present invention will become more fully apparent from the following description and appended claims taken in conjunction with the accompanying drawings.

BRIEF DESCRIPTION OF THE DRAWINGS

FIG. 3a is a flow diagram defining a "find nearest raster blob" function referred to in the flow diagram of FIG. 2a.

FIG. 3b is a flow diagram illustrating an example of a preferred method for searching for the nearest raster blob as defined by the flow diagram of FIG. 3a.

FIG. 4 is a flow diagram defining a "recognize shape of blob" function referred to in the flow diagram of FIG. 2a.

FIG. 15 is a flow diagram defining the "erase entity from raster image" function referred to in FIG. 2a.

FIG. 18 is a diagram showing an example of cutting a selected entity away from an intersecting raster objects.

DESCRIPTION OF THE PREFERRED EMBODIMENTS

Reference is now made to the drawings wherein like parts are designated with like numerals throughout.

Figure 1:
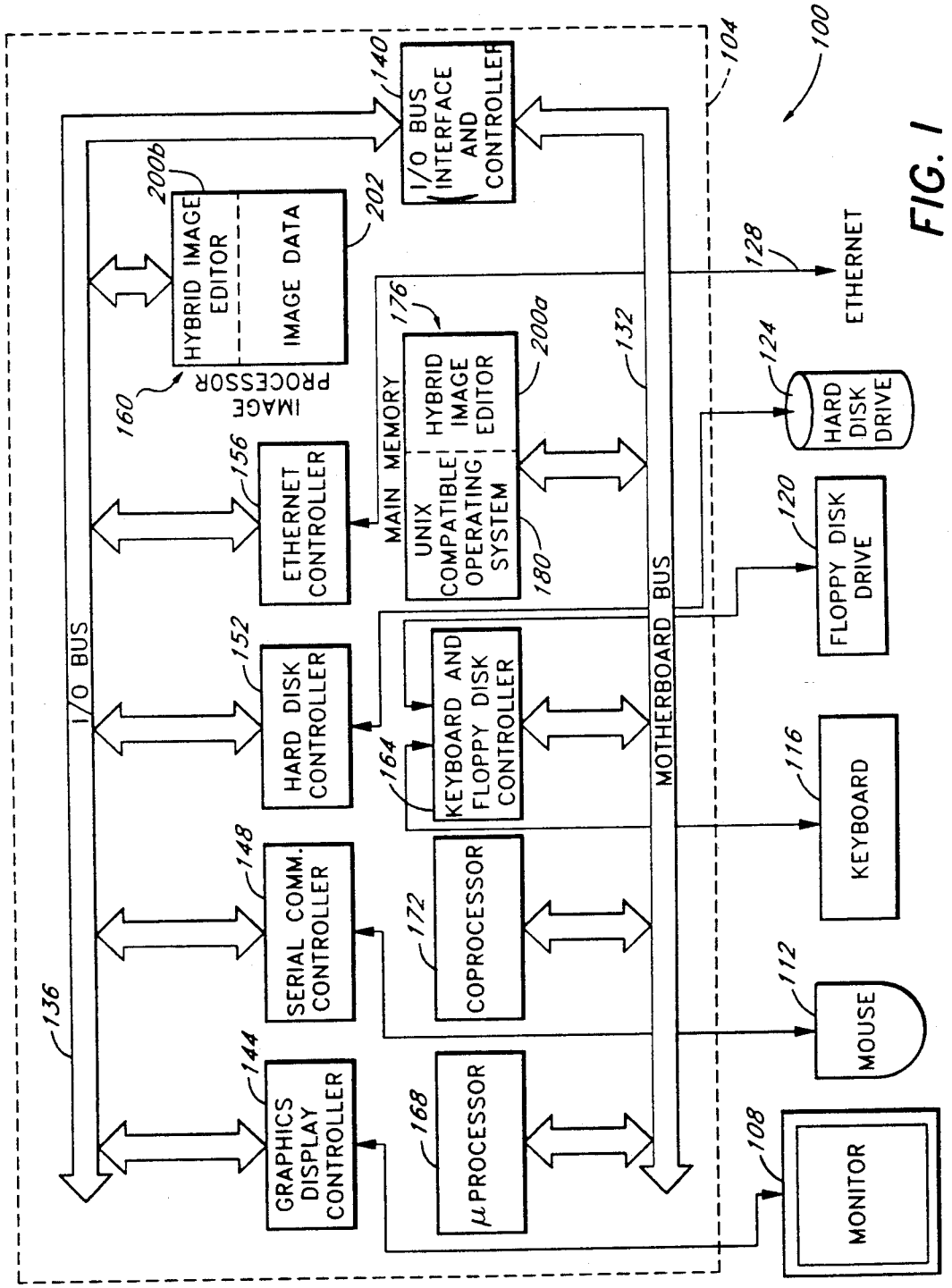
FIG. 1 is a block diagram showing one preferred embodiment of a computer system that includes the present invention.

FIG. 1 illustrates a computer workstation generally indicated at 100 which is representative of the type of computer that is used with the present invention. The workstation 100 comprises a computer 104, a color monitor 108, a mouse 112, a keyboard 116, a floppy disk drive 120, a hard disk drive 124 and an Ethernet communications port 128. The computer 104 includes a motherboard bus 132 and an I/0 bus 136. The I/O bus 136, in one preferred embodiment, is an IBM PC/AT ® bus, also known as an Industry Standard Architecture (ISA) bus. The two buses 132, 136 are electrically connected by an I/O bus interface and controller 140.

The I/O bus 136 provides an electromechanical communication path for a number of I/O circuits. For example, a graphics display controller 144 connects the monitor 108 to the I/O bus 136. In the presently preferred embodiment, the monitor 108 is a 19-inch color monitor having a 1,024×768 pixel resolution. A serial communications controller 148 connects the mouse 112 to the I/O bus 136. The mouse 112 is used to "pick" an image entity displayed on the monitor 108.

The I/O bus 136 also supports the hard disk drive 124, and the Ethernet communications port 128. A hard disk controller 152 connects the hard disk drive 124 to the I/O bus 136. The hard disk drive 124, in one possible configuration of the workstation generally indicated at 100, stores 60 megabytes of data. An Ethernet communications controller 156 connects an Ethernet communications port 128 with the I/O bus 136. The Ethernet communications controller 156 supports the industry standard communications protocol TCP/IP which includes FTP and Telnet functions. The Ethernet communications port 128 of the preferred embodiment allows the workstation 100 to be connected to a network which may include, among other things, a document scanner (not shown) and a print server (not shown).

An image processor, generally indicated at 160, is also connected to the I/O bus 136. The image processor 160 includes, for example, a Texas Instuments TI34010 and a 12 megabyte image memory. The image processor 160 provides specialized functions for storing and processing hybrid raster and vector images. However, the use of the image processor 160 or other specialized hardware is not a necessary requirement to practice the present invention.

The motherboard bus 132 also supports certain basic I/O peripherals. For example, the motherboard bus 132 is connected to a keyboard and floppy disk controller 164 which supports the keyboard 116 and the floppy disk drive 120. The floppy disk drive 120, in one present configuration, can access floppy disks which store up to 1.2 megabytes of data.

The fundamental processing components of the computer 104 are a microprocessor 168 such as, for example, an 80×86 microprocessor manufactured by Intel, a coprocessor 172 such as, for example, a 80×87 math coprocessor also manufactured by Intel and a main memory generally indicated at 176 comprising, for example, 4 megabytes of random access memory (RAM). The main memory 176 is used to store certain computer software including a Unix compatible operating system 180 such as, for example, SCO Xenix licensed by Santa Cruz Operation of Santa Cruz, Calif., a subsidiary of Microsoft Corporation, and a hybrid image editor 200.

As shown in FIG. 1, the various software functions of the hybrid image editor 200 are distributed between the main memory 176 at 200a and the image processor 160 at 200b. The hybrid image editor 200 of the present invention is used to process an image data file 202. In the preferred embodiment of FIG. 1, the image data file 202 also resides in the image processor 160. The image data file 202 is created, for example, by inserting a hardcopy document, such as a 12 square foot E-size drawing at 200 dots per inch (DPI) or a three square foot C-size drawing at 400 DPI, into the document scanner (not shown) and, thereafter, the image data file 202 is transmitted to the workstation 100 via the Ethernet communications port 128.

Although a representative workstation has been shown and described, one skilled in the applicable technology will understand that many other computer and workstation configurations are available to support the present invention.

Figure 2A:
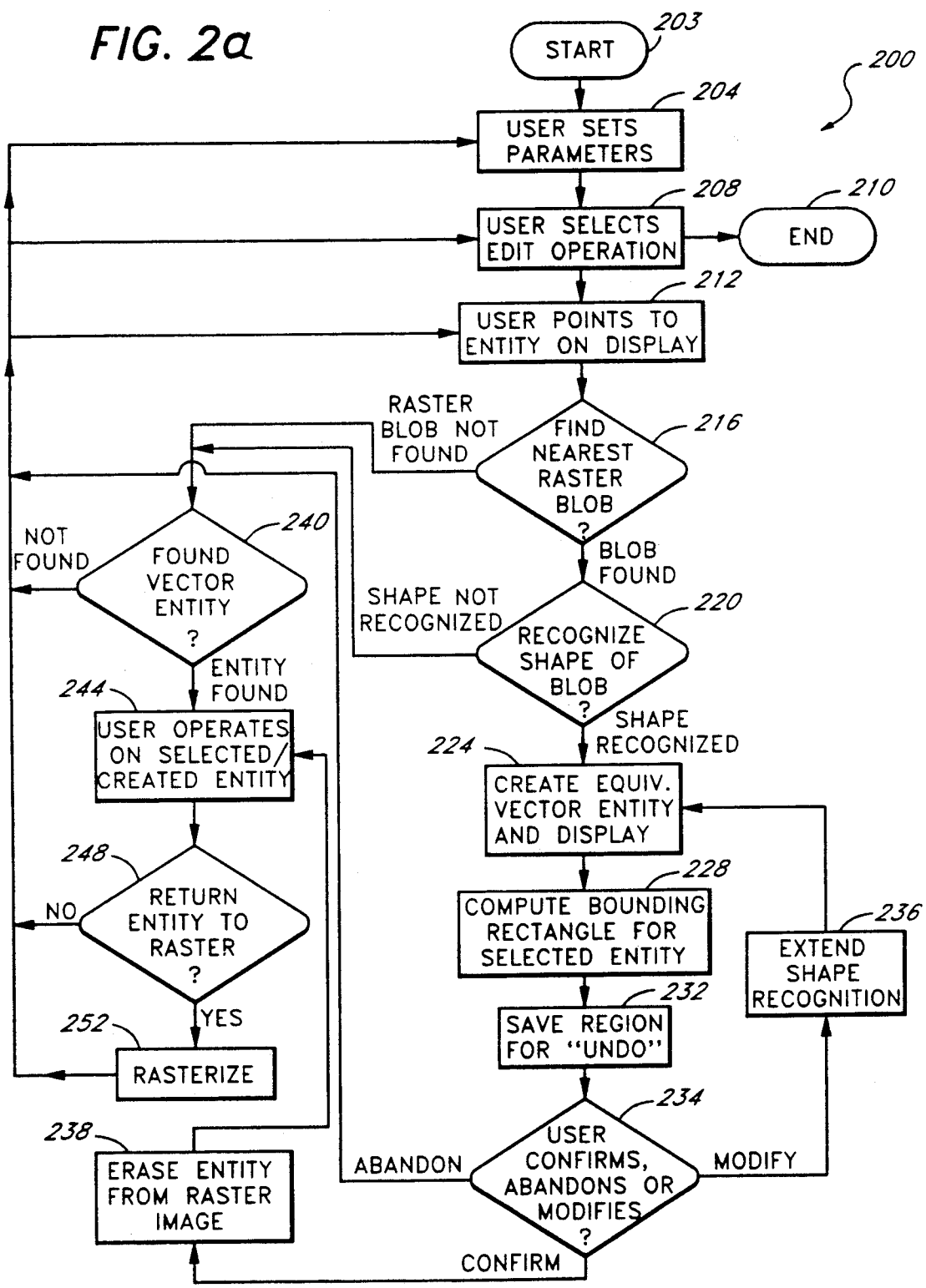
FIG. 2a is a top-level flow diagram of one preferred embodiment of the hybrid image editor of the present invention.

FIG. 2a represents the top-level control flow of the hybrid image editor generally indicated at 200. The hybrid image editor 200 is executed on the workstation 100 as shown in FIG. 1. Upon initiation of execution from a start state 203, the hybrid image editor 200 loads the image data file 202 from either a floppy disk or the hard disk 124 into the image processor 160 and then displays the image data 202 on the color monitor 108. The editor 200 then moves to a state 204 wherein the user sets certain parameters. The parameters to be set are selected from a menu by the user through the use of the mouse 112 (FIG. 1). The parameters in the presently preferred embodiment include the type of entity, or type of raster representation of a geometric shape, which is to be selected by the user such as line, polyline, circle (or circular arc) and ellipse (or elliptical arc). Although the presently preferred embodiment of the hybrid image editor 200 specifically offers the above-stated entity types, other types of entities, such as regular polygons, could optionally be specified.

After the user provides an entity type choice to the editor 200, the editor 200 moves from the state 204 to a state 208 where the user selects an edit operation from another menu displayed on the monitor 108. The presently preferred embodiment provides a set of edit operations that include STOP, which causes the editor 200 to terminate execution at state 210, GRAB, which initiates a "selective conversion", i.e., a transformation of a raster entity into a vector entity, and UNDO, which returns the image to the state it was in before the last sequence of edit operations were performed.

In addition to the three edit operations discussed, the user may set two ON/OFF toggles identified on the monitor 108 as JUMP GAPS and CROSS INTERSECTIONS. If JUMP GAPS is toggled to ON then missing pixels in a line are automatically accounted for by hypothesizing that the gap is not intended, and the editor 200 therefore "jumps" the gap. Such a toggle selectable function is useful because pixels may be missing from a raster entity due to an incomplete rasterization by a document scanner or, as another example, because the raster entity is defined by a dashed line style. The second toggle selectable function, CROSS INTERSECTIONS, allows the editor 200 to select one entity from among any number of overlapping entities. With the edit operations selected, the editor 200 moves to a state 212, wherein the user points to an entity on the monitor 108 with the mouse 112. The states 204, 208 and 212 are more fully understood by referring to FIG. 2b which is discussed hereinafter.

Further discussions relating to flow diagrams, herein, will include parenthesized names which correspond to source code modules written in the "C" programming language. The referenced source code modules are attached herewith as object code listings in the Microfiche Appendix. The object code corresponding to the main memory portion of the hybrid image editor 200a (FIG. 1) was generated from the source code using a "C" compiler licensed by SCO of Santa Cruz, Calif. The object code corresponding to the image processor portion of the hybrid image editor 200b was generated with a "C" compiler licensed by Texas Instruments. However, one skilled in the technology will recognize that the steps of the accompanying flow diagrams can be implemented by using a number of different compilers and/or programming languages.

Figure 3A:
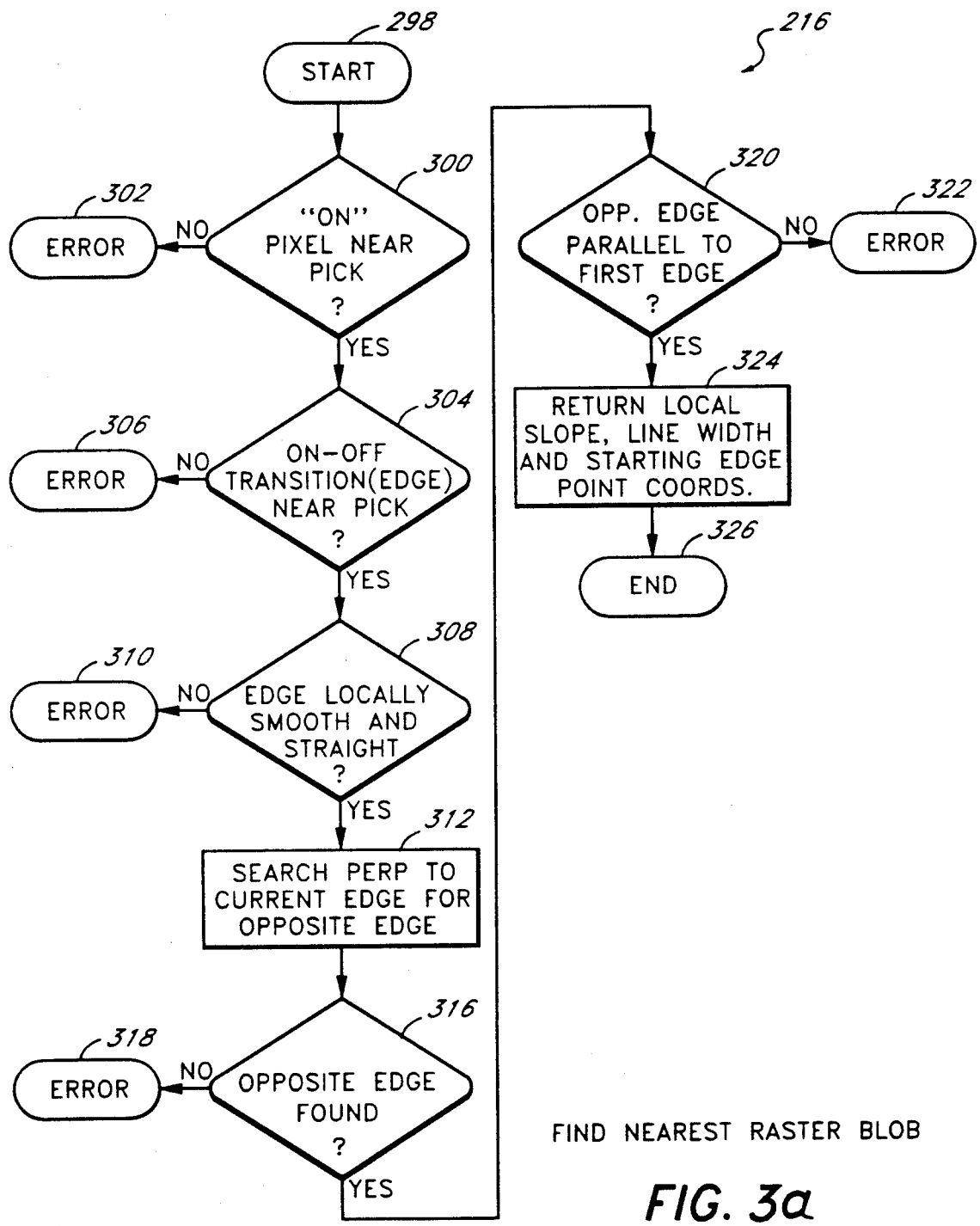
Figure 4:
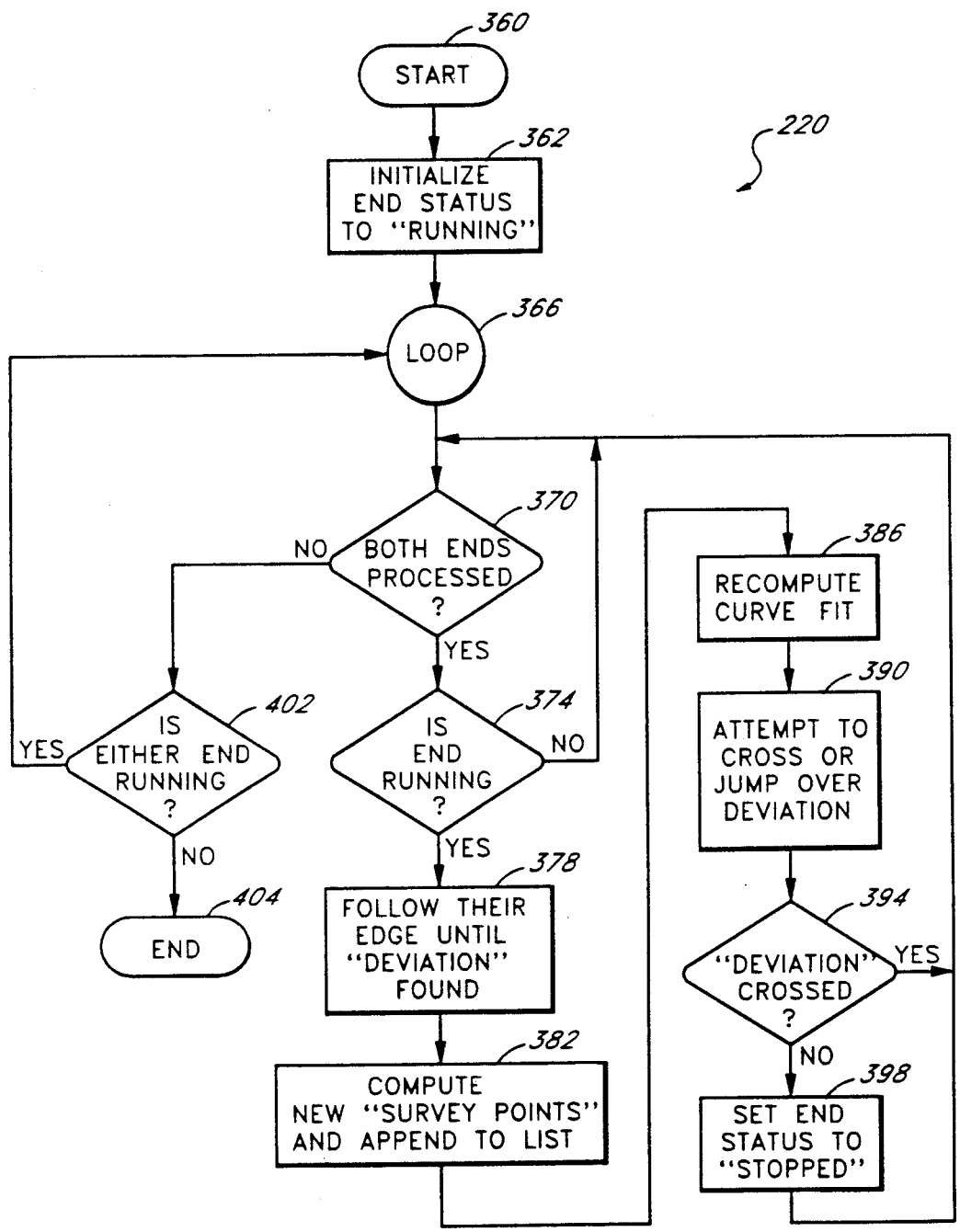

Returning to FIG. 2a, following detection of a user pointing to an entity in state 212, the editor 200 initiates the selective conversion of raster entities by moving to function 216 (Istartcurve.c; FIG. 3a) wherein it functions to find the nearest raster "blob". A raster blob is defined to be a group of pixels which together form a portion of an image entity or other type of raster object in the image data 202. If a blob is found, the editor 200 moves to function 220 (IgrabLINE.c, IgrabMLINE.c, IgrabCARC.c, IgrabEARC.c; FIG. 4) and attempts to recognize the shape of the blob. This shape recognition is accomplished by an attempt to fit pixels in the image data 202 to a canonical equation for a geometric shape, such as a line, polyline, circle or ellipse. If indeed the shape of the blob is recognized, then the editor 200 moves to state 224 where it creates and displays the equivalent vector entity. At this point the user will observe on the monitor 108 a vector entity and a raster entity occupying roughly the same coordinate space. The two types of entities are distinguished by different colors.

From the state 224 the editor 200 moves to a state 228 wherein a bounding rectangle is computed for the selected entity. The extent of the bounding rectangle can readily be found from the minimum and maximum of the x and y Cartesian coordinates of all pixels belonging to the selected entity. From the state 228 a transition is made to a state 232 wherein the selected rectangular bit-map is copied to a scratch area of the memory of the image processor 160. From state 232 the editor 200 moves to a state 234 wherein the user is again requested to provide input to the editor 200. The user may select from the following three operations which are displayed on the monitor 108: ABANDON, which causes the abandonment of any changes before they occur, CONFIRM, which confirms the desired edit changes, or MODIFY, which allows user interaction to manually cross gaps or intersecting objects. In addition, in the state 234, there are three ON/OFF toggle functions including DELETE RASTER, for deleting a raster entity, DELETE VECTOR, for deleting a vector entity, and RASTERIZE, for converting a vector entity into a raster entity. The state 234 is more fully understood by referring to the discussion relating to FIG. 2c below.

Figure 15:
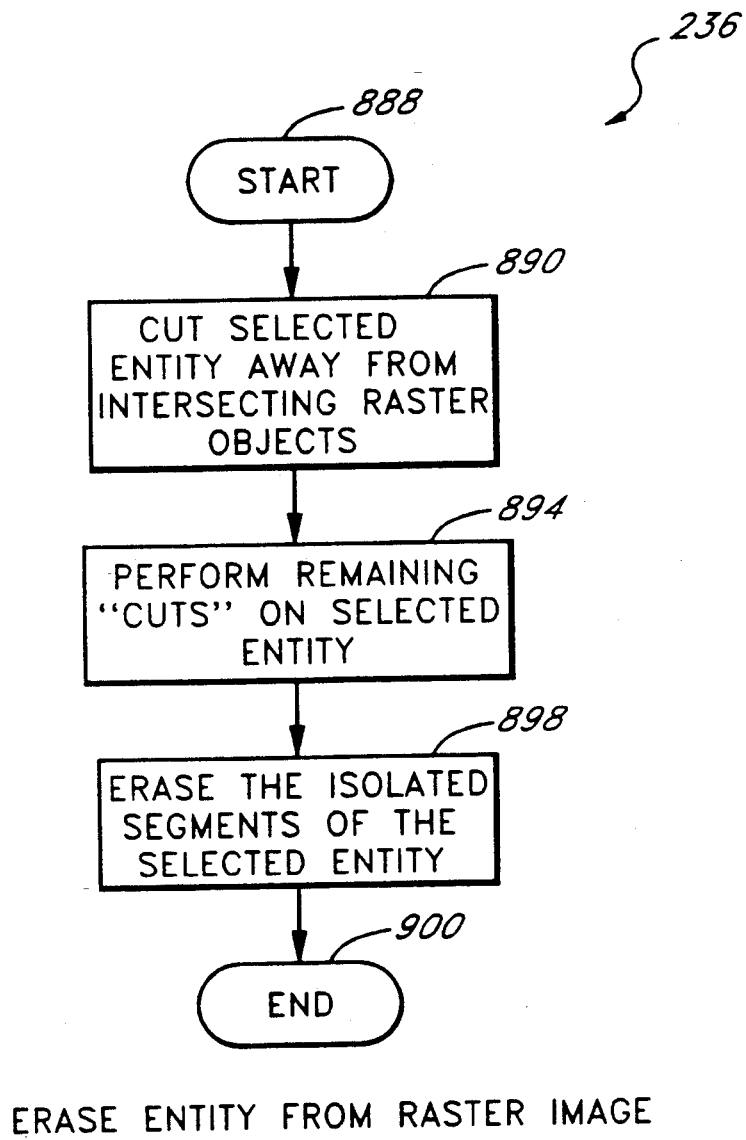

Continuing in FIG. 2a, if in state 234 the user chooses to extend, or MODIFY, the shape recognition, then a function 236 is entered to so extend the shape recognition of the selected entity to additional pixels in the image data 202, and this flow eventually returns to the state 224. If in the state 234 the user chooses to CONFIRM, the erasure is completed by entering a function 236 (function Iclipgbdobj() in dsIclipgbdobj.c; FIG. 15) which erases the selected entity from the raster image. If ABANDON is chosen by the user in the state 234, the editor 200 returns to processing at one of states 204, 208 or 212.

Now, assuming that a raster blob was not found in the function 216, or a shape was not recognized in the function 220, a search is conducted, at a state 240, for the nearest vector entity to the cursor position on the monitor 108. If a vector entity is found, then the user may perform vector operations on the selected or created entity at a state 244, which may also be arrived at from the "erasing the selected entity from the raster image" state 238. In the presently preferred embodiment, vector editing software to carry out the function of state 244 is an off-the-shelf program called VisionAEL that can be licensed from ael-Advanced Graphics Systems of Tulsa, Okla.

Once vector operations are completed, the editor 200 moves from the state 244 to a state 248 to determine whether the previously "converted" vector entity is to be stored in the image data 202 as a raster entity However, if the current vector entity is a vector entity that was located as a result of the "find nearest vector entity" state 240, that is, the vector entity was not previously selectively converted, then the test cannot be satisfied and a path is taken back to any of the states 204, 208, 212 which can be incorporated into a single menu on a screen display of the monitor 108. If the user desires to convert the vector entity which has been previously selectively converted, as indicated by the RASTERIZE toggle, such an operation takes place at a state 252. Return to the initial screen display may be taken from any of the states 240, 248 or 252.

Figure 2B:
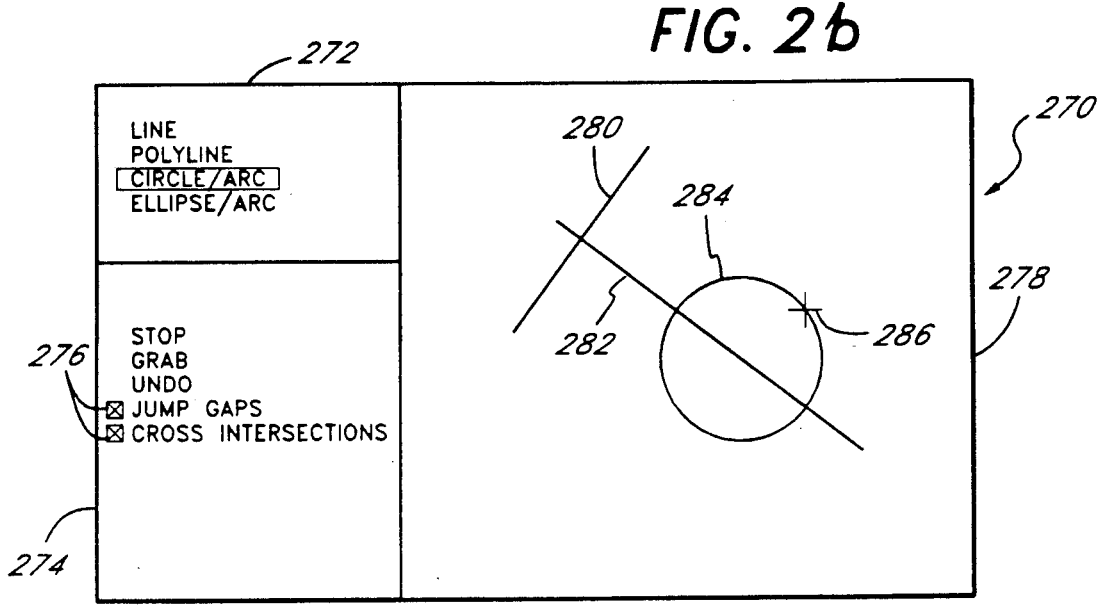
FIG. 2b illustrates a computer screen display showing user selectable parameters and edit operations according to one aspect of the present invention.

Turning now to FIG. 2b, a computer screen display 270 is illustrated, as it would be reproduced on the monitor 108 of FIG. 1. The screen of display of FIG. 2b is an example of what a user would see when the editor 200 is in states 204, 208 and 212 of FIG. 2a. The display 270 comprises user selectable parameters 272, user selectable edit operations 274, including a pair of toggles 276, and an entity window 278. The entity window 278 of FIG. 2b shows a simple composite of three overlapping entities. These entities include a line 280, another line 282 and a circle 284. In the state 212 (FIG. 2a) a cursor 286 is placed over a portion of the circle 284 as shown in FIG. 2b.

Figure 2C:
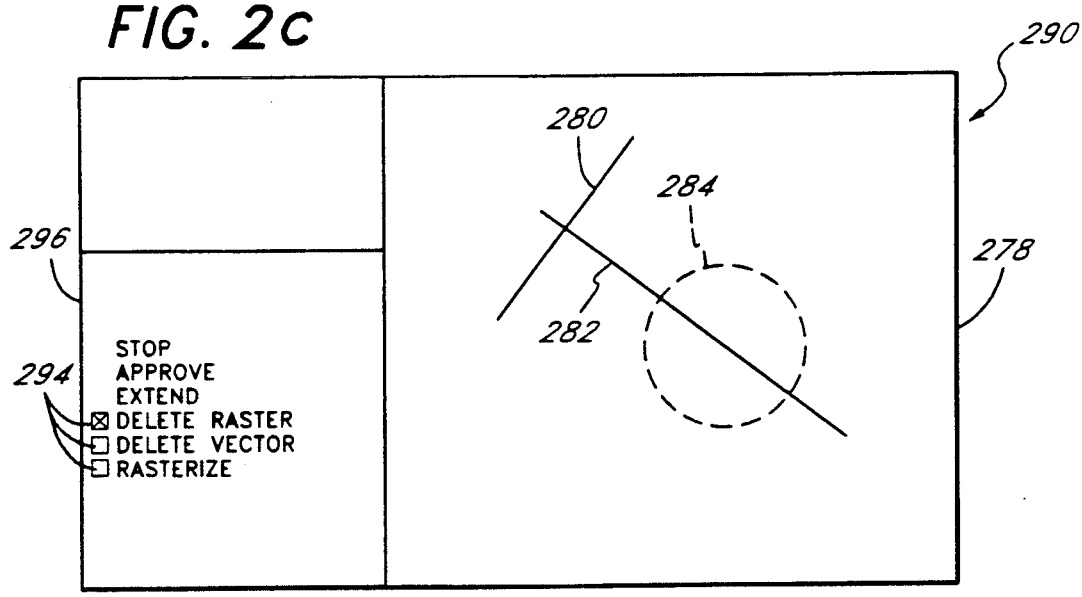
FIG. 2c illustrates a computer screen display showing user confirmations according to one aspect of the present invention.

FIG. 2c illustrates a second screen display 290, as it may appear on the monitor 108 (FIG. 1) when the editor 200 is in the state 234 shown in FIG. 2a. Approval or extension of the last edit operation is selected from the three toggles 294 of the menu 296 by the mouse 112 (FIG. 1). In this example (FIG. 2c), the user has only activated the DELETE RASTER toggle. In response to that selection, the entity window 278 in FIG. 2c shows that the circle 284 has been converted to vector format, and the raster entity has been deleted. Thus, the hybrid image editor 200, after reading in the image data file 202, can be used to edit a "pure" raster image containing only raster entities, or it can be used to edit a hybrid image containing both raster and vector entities, entities which are stored in the editor 200 as separate but coordinated databases of raster and vector entities.

FIG. 3a illustrates the control flow for the find nearest raster blob function 216 of FIG. 2a. The editor 200, at function 216, attempts to find the location, local direction and width of the entity "attached" to the specific pixel which has been picked by the user with the mouse 112 (FIG. 1). The editor 200, at the function 216, inputs an x-y pair of world coordinates for the selected pixel. If a raster entity is to be found near the selected pixel, the selected pixel must be "on" or near a locally line-like set of pixels. The editor 200 begins execution at a state 298 and moves to a state 300 to determine whether there are any "on" pixels, i.e., a raster blob, near the selected pixel by conducting a pixel search. A maximum radial search area defines the extent of the search, also called an error ellipse, for the "nearness" of an "on" pixel. If the test 300 is not satisfied, the editor 200 moves to state 302, wherein function 216 terminates with the condition that a raster blob could not be found.

From the state 300, assuming an "on" pixel was found near the pick, the editor 200 moves to a state 304 to determine if there is an "on-off" transition near the pick, indicating that the editor 200 at function 216 has located an edge. In state 304, the editor 200 searches pixels in a spiral-like pattern according to the four directions of the compass. If no "on-off" transition is found, the editor 200 moves to a state 306 and terminates the function 216 with an error condition. If an edge is found in state 304, then the editor 200 moves to a state 308 and determines whether the edge is locally smooth and straight.

The process conducted in the state 308 is begun by gathering some edge points near the located edge point into a list of edge pixels. In the preferred embodiment, the gathering of edge pixels is carried out by the image processor 160, while most "high-level" functions are executed by the microprocessor 168 and coprocessor 172. The editor 200 uses the well-known least squares error algorithm, inputing the list of edge pixels to determine the slope of the local edge. An edge slope vector is then oriented to point in the direction of propagation of the current local edge slope The orientation is accomplished by checking the sign of the dot product between the edge slope vector and the vector connecting the last edge point gathered by each of two edge followers. The two edge followers are termed clockwise and counterclockwise edge followers and the reason for this naming convention will become more readily apparent from the discussion below.

To check whether the edge is generally straight in this vicinity, the length of the local edge vector is calculated and tested against a minimum fit length. If the edge is not locally smooth and straight then an error condition is signalled by a state 310 and the control flow at function 216 terminates. Assuming a locally smooth and straight edge vector is found then, from the state 308, the editor 200 moves to a state 312 to initiate an opposite edge search perpendicular to the current edge vector by "slicing" through the entity.

If an opposite edge is not found at state 316 then an error condition is signalled at a state 318 and the editor 200 terminates control flow at function 216; otherwise, the editor 200 moves to a state 320 to determine whether the opposite edge vector is parallel to the original edge vector. The function of this state is decomposed into the following steps: (1) gathering edge points for the opposite edge as previously discussed for the original edge, (2) running a least squares error algorithm between both lists of edge pixels to determine whether they are parallel, and (3) determining the minimum fit against a parallel slope as was determined with the original edge slope. If no parallel edge is found, then the editor 200 moves to a state 322 wherein an error condition is signalled and the control flow at function 216 terminates. Otherwise, the editor 200 moves to a state 324 which returns a local edge slope, line width and starting edge point coordinates and control at function 216 terminates normally at a state 326.

Figure 3B:
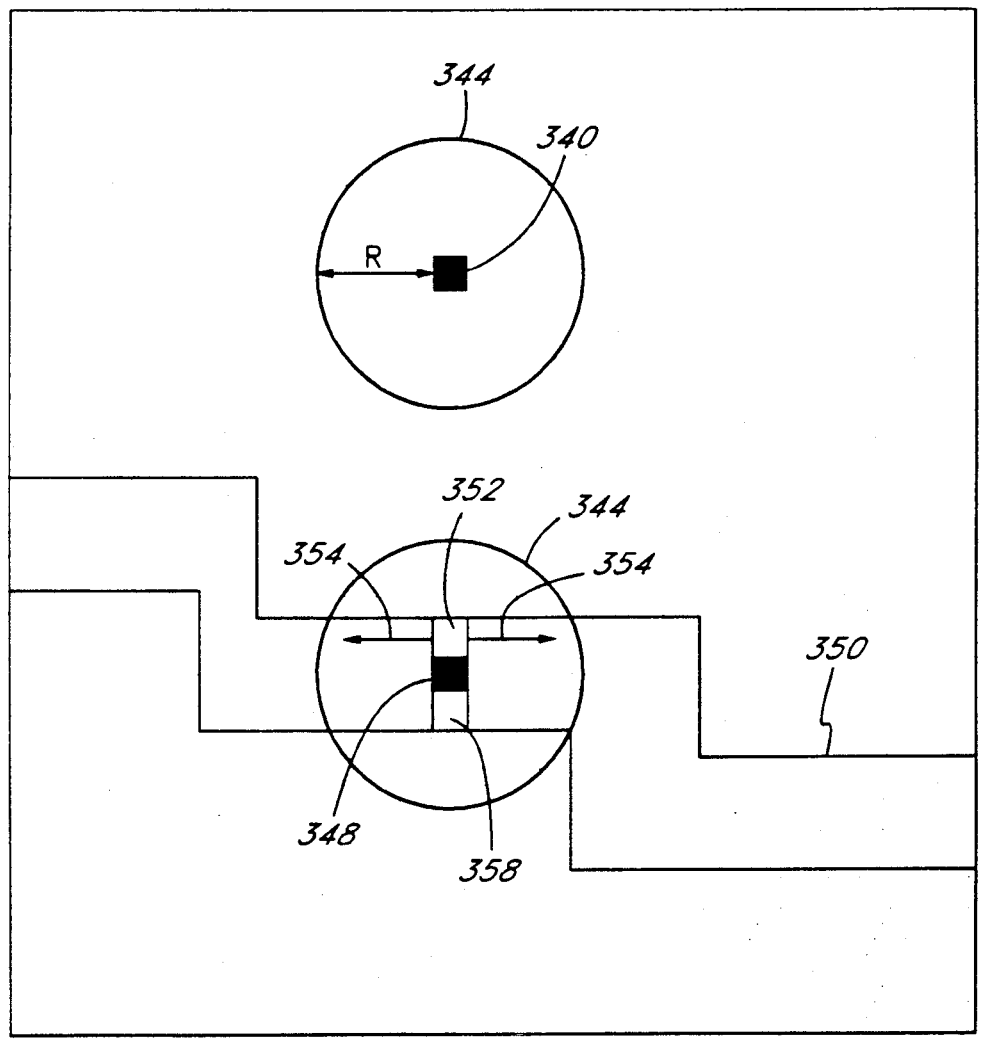

The control flow of FIG. 3a is more fully understood by referring to the raster blob example of FIG. 3b. In the example, a selected pixel 340 is not located in or near any raster blob. An error ellipse 344, having a radius R, limits the search for so-called "on" pixels near the pixel 340. In this case, the test in the state 300 fails.

Another pixel 348 is located on a raster blob 350. The pixel 348 immediately satisfies the pixel search test of the state 300. A pixel 352 on the raster blob 350 is then located and determined to be an "on-off" transition near the pick pixel 348. By extending the edge with edge followers, along the lines 354, the edge of the raster blob 350 is found to be locally smooth and straight. Thereafter, a slice is taken through the blob 350 to a second on-off transition pixel 358, where the same steps are taken to find the opposite edge of the blob 350 and determine that the edge comprising pixel 358 is parallel (to lines 354), smooth and straight.

Figure 5:
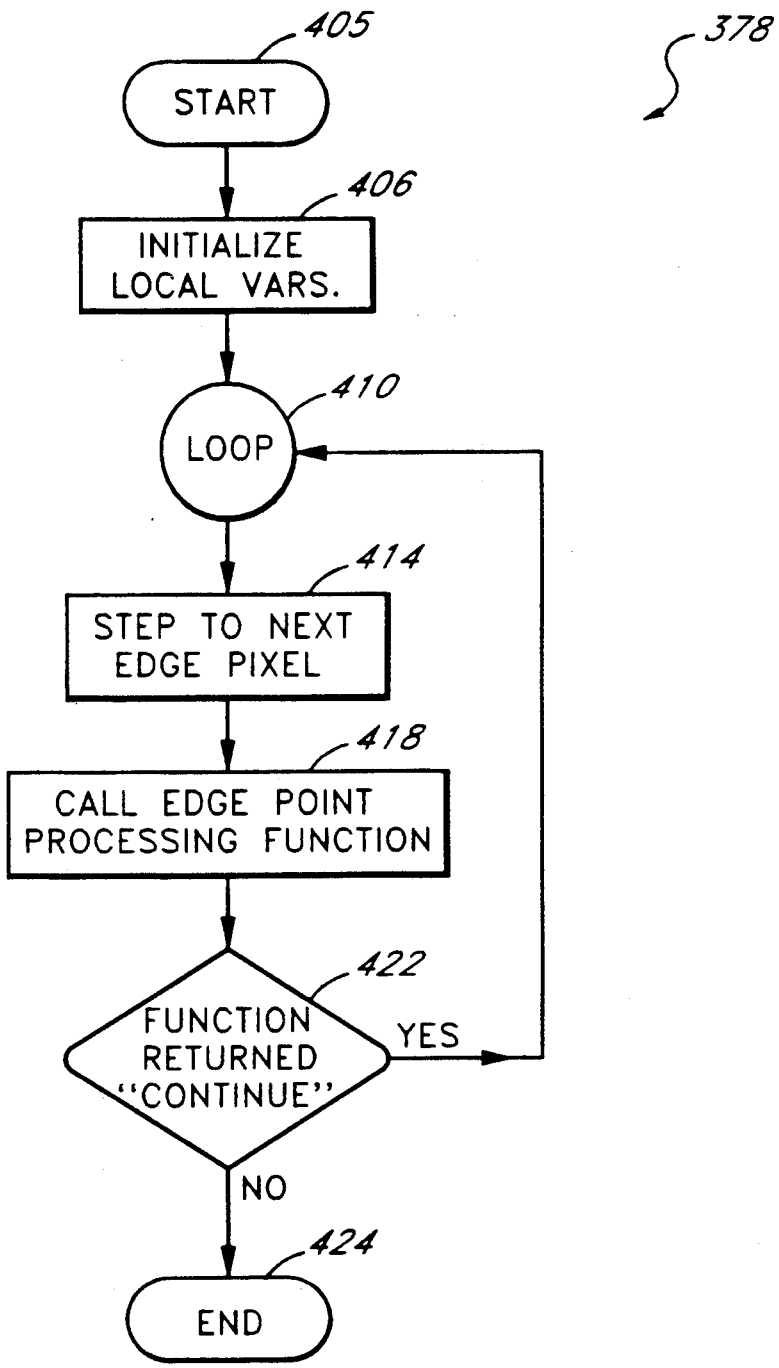
FIG. 5 is a flow diagram defining the generalized "edge following" function shown in FIG. 4, which includes clockwise and counterclockwise edge followers.
Figure 8:
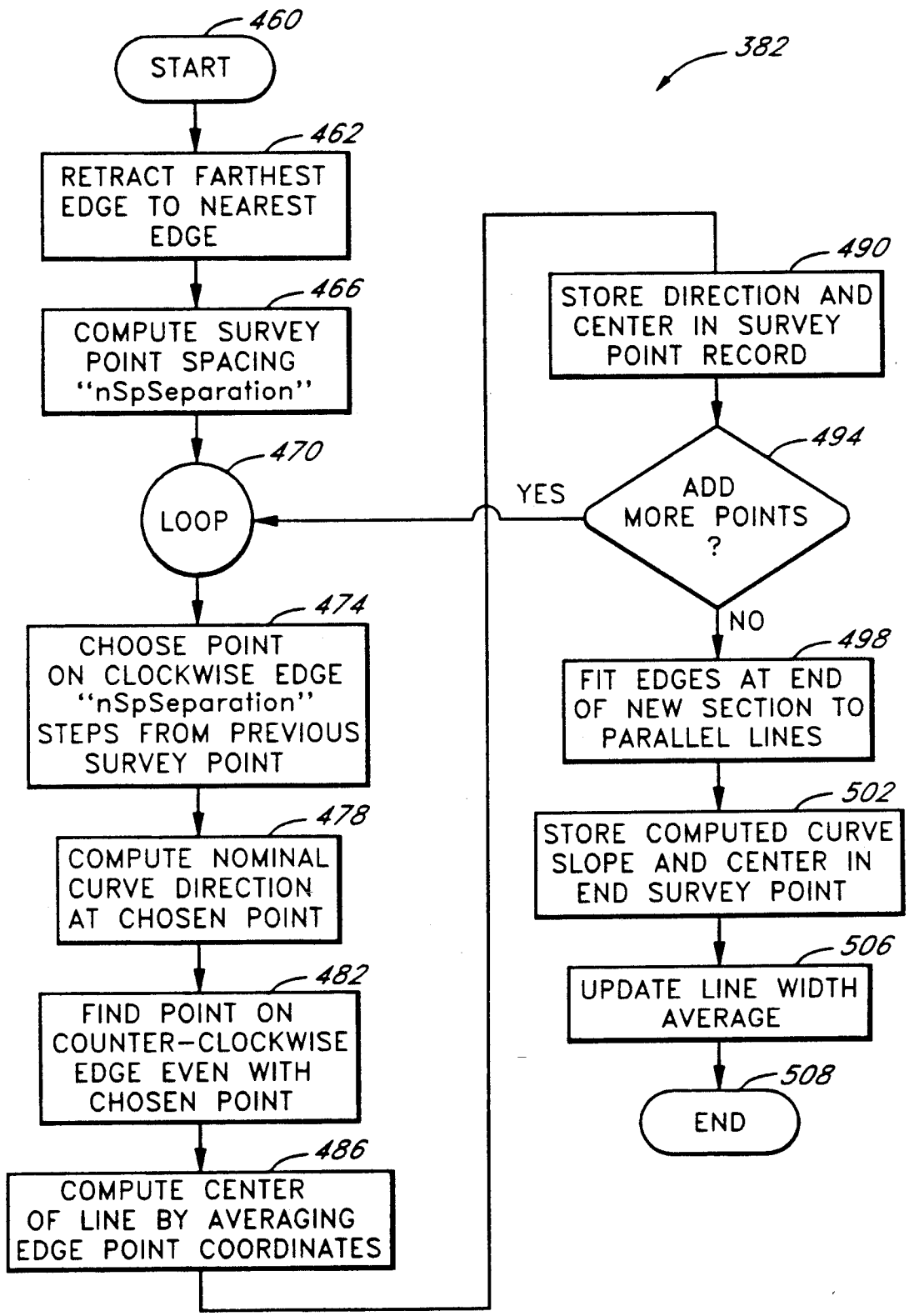
FIG. 8 is a flow diagram defining the "compute new survey points and append to list" function referred to in FIG. 4.
Figure 9:
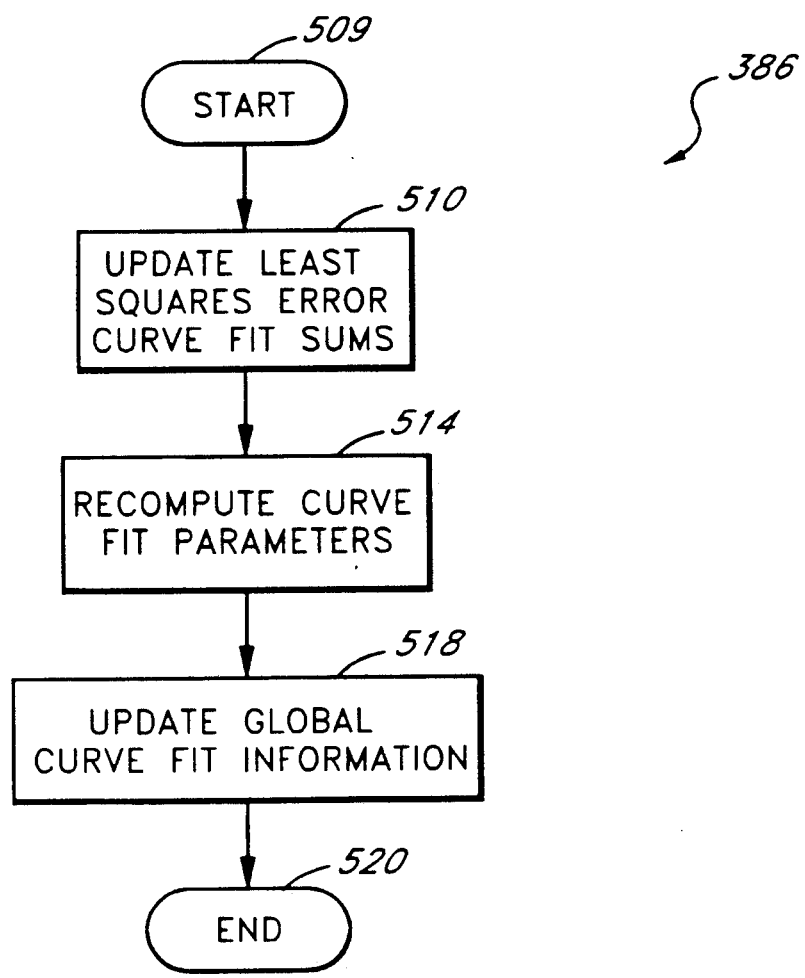
FIG. 9 is a flow diagram defining the "recompute curve fit" function referred to in FIG. 4.

FIG. 4 illustrates the flow diagram for the "recognize shape of blob" state 220 of FIG. 2a. Operation of this function begins at a state 360 and moves to a state 362 where the end status of each edge end is initialized to "running". An outer DO-WHILE-loop of the control flow is entered at a state 366 and continues while either end is "running," i.e., no deviation has stopped edge extensions An inner FOR-loop begins at a state 370 and loops twice, once for each end If an end is "running," as shown at a state 374, then a path is taken to a state 378 (function Icwedge() in icwedge.c, function Iccwedge() in iccwedge.c; FIG. 5) where the edges are followed until a "deviation" is found. A deviation is generally defined to be an intersection, a bend or a gap. In a subsequent function 382 (IvEupend.c; FIG. 8) new "survey points" are appended to the list of edge pixels. Survey points are points stored in memory which represent points on the reference line of the curve, wherein the reference line is a line bisecting the width of the line between the parallel edges being followed. In this way, pixels collected by the edge followers are eventually discarded and, thereby, unnecessary storage of pixels is avoided. In addition, edges are evened up to correlate with a single end of a line. The updated list of edge pixels is then run through a curve fit algorithm at a function 386 (IupdLINE.c; FIG. 9) to update the slope of the line.

An attempt is made to cross or jump over the deviation at a function 390 (IvRestartEnd.c; FIG. 10). If the deviation is not crossed or jumped as tested at a state 394, then the end status is set to "stopped" at a state 398. Alternatively, if the deviation is crossed at the state 394, then the FOR-loop is continued. The same path is also taken from the state 398. The FOR-loop is terminated if either end is not "running" at the state 374. Once the FOR-loop cycles twice, i.e., one cycle per end of the selected raster entity, the editor 200 moves from the state 370 to a state 402 where a test is made as to whether either end is "running". If either end is "running", after crossing a deviation, then the outer loop, or DO-WHILE-loop, is continued back at the state 366. Otherwise, the function of the function 220 terminates at a state 404. The same basic control flow as shown in FIG. 4 will apply to each type of entity, namely, as presently specified, lines, polylines, circular arcs and elliptical arcs. Although the specific algorithms for each type of entity will be somewhat different, each specific algorithm is within the capabilities of one skilled in the relevant technology to understand.

Figure 7:
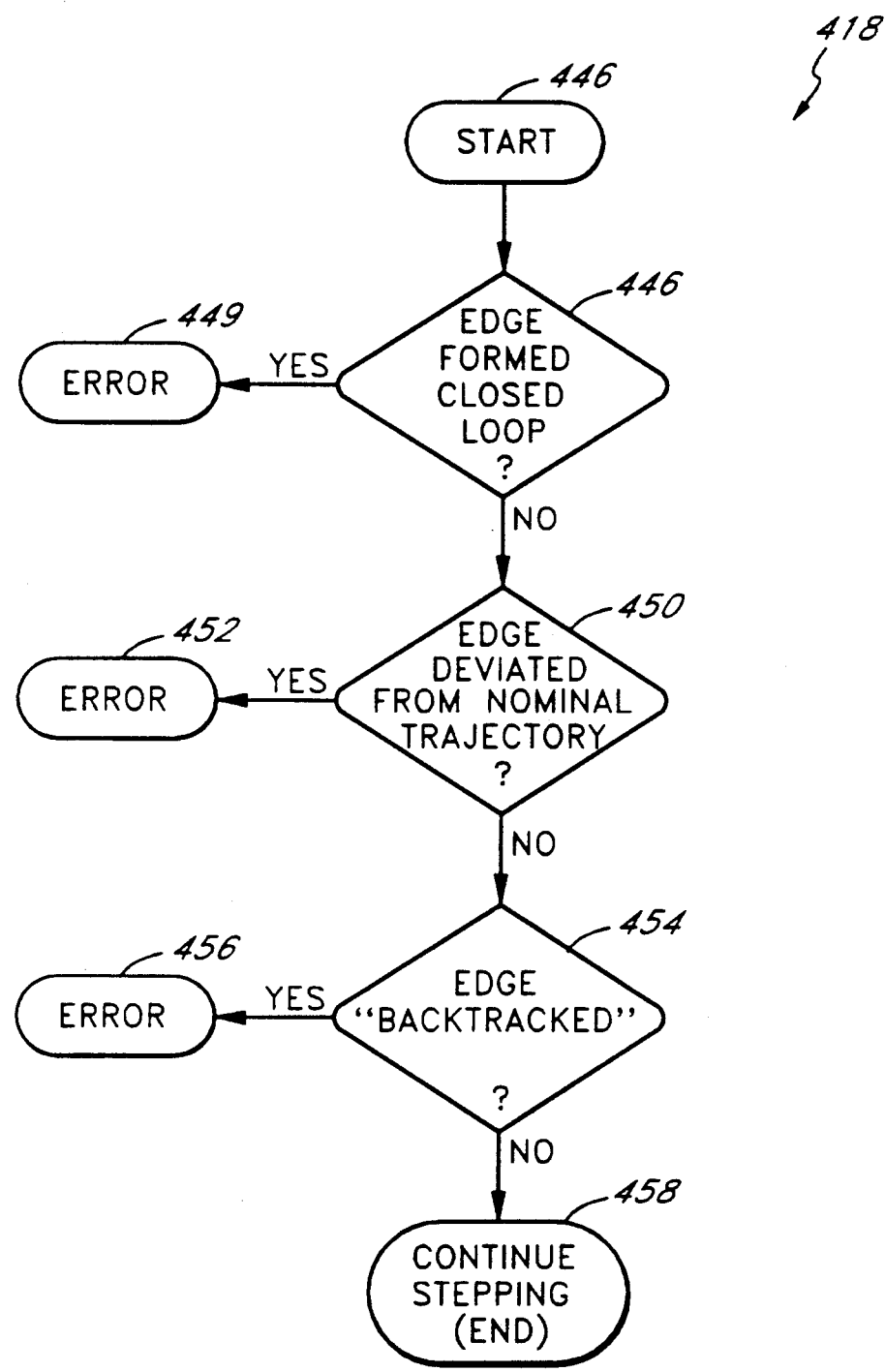
FIG. 7 is a flow diagram defining the "edge point processing" function referred to in FIG. 5.

Referring now to FIG. 5, a control flow is shown for the generalized edge follower function 378 of FIG. 4. Operation in function 378 takes two different forms: first, as a clockwise edge follower and, second, as a counterclockwise edge follower. In either case, as represented by the generalized edge following function 378, after entering the function 378 at a state 405, local variables are initialized at a state 406. The main loop is entered at a state 410 where the editor 200 proceeds to step to the next edge pixel at a state 414. An edge point processing function 418 (function survedge() in IgrabLINE.c; FIG. 7) returns a value. If the value returned from the function 418 is determined to be "continued", at a state 422, then the editor 200 continues the loop at the state 410. Otherwise, the control flow for the function 378 terminates at a state 424.

Figure 6A:
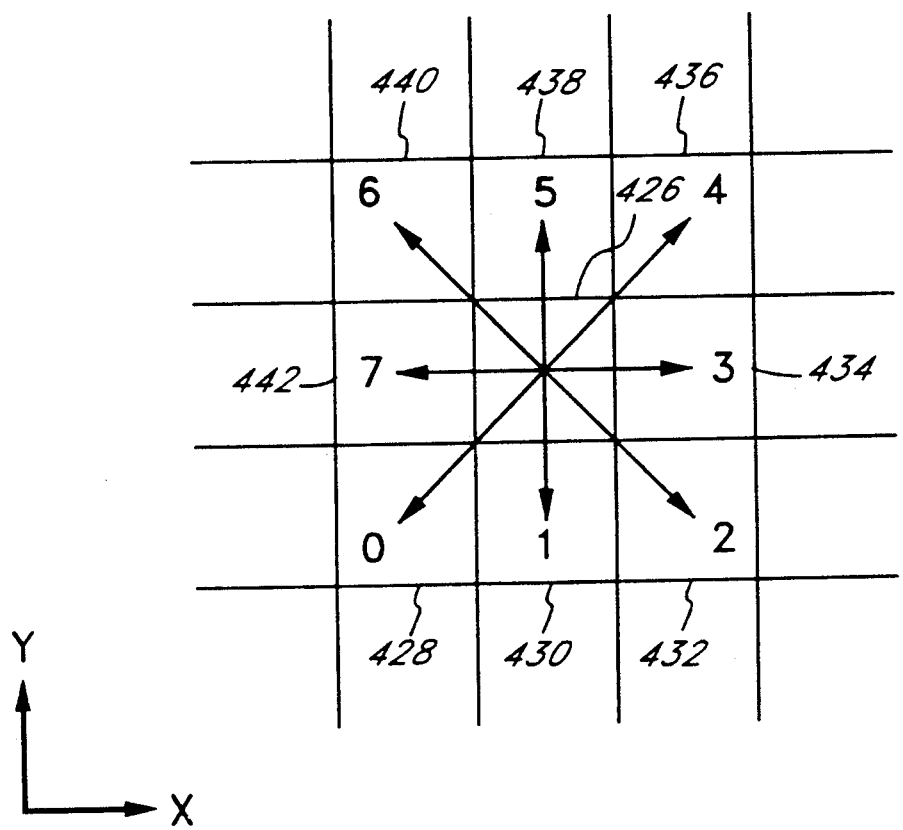
FIG. 6a is a diagram showing one preferred embodiment of edge follower direction conventions which are adhered to by the edge following function represented by the flow diagram of FIG. 5.

FIG. 6a represents the edge follower direction convention. At each step, system operation in the edge follower function 378 moves from a current pixel 426 to one of its eight neighboring pixels. The neighboring pixels, or directions, are labelled consecutively, moving counterclockwise, beginning with a "0" pixel 428 located in a southwesterly direction. Thus, the "0" pixel 428 is followed by: a "1" pixel 430, a "2" pixel 432, a "3" pixel 434, a "4" pixel 436, a "5" pixel 438, a "6" pixel 440 and a "7" pixel 442.

Figure 6B:
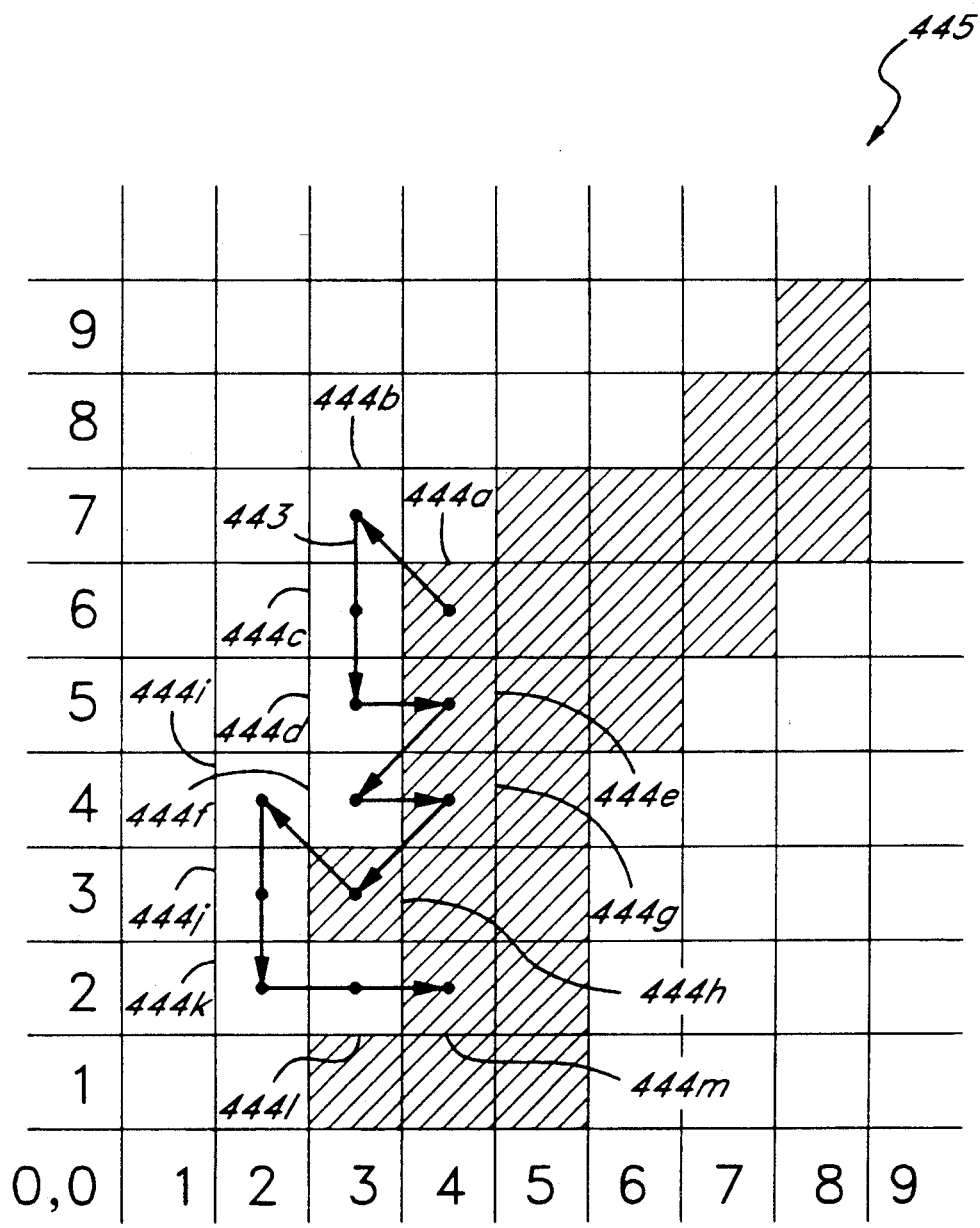
FIG. 6b is a diagram showing an example path taken by the counterclockwise edge following function.

FIG. 6b illustrates an example of a path 443 taken by the counterclockwise form of the edge follower function 378. An initial "on" pixel 444a is the starting point for the path 443 which ends at a termination pixel 444m on one edge of a line generally indicated at 445. The locations of a group of "on" edge pixels 444a, 444e, 444g, 444h and 444m are stored for further processing. The path of the clockwise edge follower fucntion 378, which is not shown, traverses the opposite edge of the line 445.

FIG. 7 illustrates the process of checking each edge point while extending the entity, as performed in function 418 of FIG. 5. Operation in function 418 begins at a state 446 and transitions to a test state 446 to determine whether the edge has formed a closed loop. A closed loop is found if the coordinates of the most recently encountered edge point are identical with the edge starting point and a "winding number"for the edge has an absolute value of eight.

Each edge follower can be represented by a state machine having eight states corresponding to the directions shown in FIG. 6a. To determine if an edge is looping back in a "J"-type bend it is helpful to keep track of the current pixel position relative to the edge follower starting point. Such position information is stored as a so-called winding number. The winding number starts at zero and it will have a value of eight after a complete counterclockwise revolution, and minus eight after a complete clockwise revolution, indicating a closed loop in either case.

As an example, consider the state machine corresponding to the counterclockwise version of the edge following function 378 (FIG. 5). Each time an "off" pixel is encountered, the winding number is incremented by one and a next state variable is set to equal the current state incremented by one. If an "on" pixel is encountered and the pixel direction or state is odd, then the winding number is decremented by one and the next state is set to equal the current state decremented by one. If an "on" pixel is encountered and the pixel direction is even, then the winding number is decremented by two and the next state is the current state decremented by two. All arithmetic operations are, of course, performed in modulo eight arithmetic. It can be shown that the edge followers described are optimal in that they never visit the same pixel twice.

If a closed loop is indicated at the state 448, then a "loopback" condition is returned by the state 449. Otherwise, the editor 200 moves along a path from the state 448 to a state 450 where a test is made to determine whether the edge has deviated from a nominal trajectory, indicating that a flare was found. A nominal trajectory, as defined by the above-mentioned reference line, is maintained within a band outlined by flare lines which are projected lines running parallel to the reference line. In the state 450, a calculation is made to compare the deviation of the edge away from the reference line (or trajectory) of the edge. The flaring deviation is represented by the cross-product, or perpendicular distance, between the reference edge vector and the normalized edge extension vector. If the absolute value of the deviation is greater than a predetermined maximum value, then the "excess deviation" condition is returned by the edge point processing function 418 at a state 452. The predetermined maximum value is subject to a number of design considerations including a tradeoff between the speed and accuracy desired by the user.

On the other hand, if the nominal trajectory is maintained, then control passes from the state 450 to a state 454 which tests to determine whether the edge has "backtracked". In the state 454 the maximum extension of the edge and the direction of the reference slope is calculated. If the progress of the edge following function 378 (FIG. 5) on the edge extension reverses, as represented by the dot product of the reference edge vector and the normalized edge extension vector, then the "backtracked" condition is returned at a state 456; otherwise, a "normal" condition is returned in the state 458 and the normal processing for the function 418 terminates.

FIG. 8 illustrates the state to "compute a new set of survey points and append to list" 382 of FIG. 4. Beginning at a state 460, the editor 200 moves to a state 462 wherein the terminal edge point at which the clockwise edge follower stopped is compared against the terminal edge point at which the counterclockwise edge follower stopped. The edge that has proceeded the farthest total distance from either the picked pixel or the last deviation is retracted to the same approximate stopping point of the nearer edge. The process of evening up edges proceeds by selecting the index of the saved near terminal edge point to be the index of the starting point for retracting the far edge. The saved points of the far edge are traversed until either: (1) there are no more points left, or (2) a satisfactory dot product is achieved between (a) a vector that is tangent to the near edge which points in the direction of edge propagation and (b) a vector defined by spanning the vector space from the terminal near edge point to the current far edge point.

The editor 200 moves from the state 462 to a state 466 where the survey point spacing is calculated. Thus, by a process of statistical averaging, the pixels in the line which has been extended are discarded and in their place are stored "survey points". Basically, this means that the straighter the curve, the greater the survey point separation and, thus, the sparser the survey point list. After determining the last distance travelled, a new survey point spacing is calculated and then stored in a variable "nspseparation".

Next, a new survey point is appended to a survey point list beginning at a loop state 470. Thus, at a state 474 a point is chosen on the clockwise edge at a distance "nspseparation" from the previous survey point. A nominal curve direction is then determined at the chosen point in a state 478. A survey point is found on the counterclockwise edge that is even with the chosen point on the clockwise edge at a state 482. The center of the line is calculated by averaging edge point coordinates, at a state 486, and the center and direction of the line is stored in a survey point record which is appended to the list at a state 490. The loop continues, at a state 494, back to the loop state 470 until enough survey points have been added to the survey point list. Once the loop is exited at the state 494, line edges are fit at the end of the new line section to the nearest pair of parallel lines at a state 498.

The survey points associated with each edge are self-normalized so that the editor 200 can use faster, integer arithmetic functions. In the preferred embodiment, all data points which are not actual pixel locations are stored in a fixed point format. However, data points could be stored and processed in floating point format if desired.

In the parallel line fit state 498, if the edge points are "more horizontal than vertical", then each edge is fit to the equation $x = ay + b$; otherwise, each edge is fit to the equation $y = ax + b$. The test for "more horizontal than vertical" is based on a comparison of x and y moments of both groups of edge data. A separate line is fit to each edge, but since the resulting edges are parallel, only a single slope form is calculated. The resulting system of equations is solved by forming an upper-triangular matrix and using Gauss-Jordan elimination and back substitution. The two edges are then represented by the equations $y_1 = ax_1 + b_1$ and $y_2 = ax_2 + b_2$.

The $b_1$ and $b_2$ axis intercepts are normalized to the original origin. The intercepts are then subtracted to derive the separation distance of the two lines along the y-axis. The width of the line is calculated by multiplying the separation distance by the unit length slope. The deviation of each edge from the fit line is calculated.

The slope of the new extended line or curve is determined as is the center of the line, and these are stored in the last survey point at a state 502. The average line width is then updated at a state 506 and the control flow for the function 382 terminates at a state 508.

FIG. 9 presents the "recompute curve fit" function 386 of FIG. 4. The function 386 updates line fit information by adding the newly acquired survey points to the existing least squares line fit data. The new survey points are checked for alignment with the existing line fit. The curve end may be terminated if the survey points go out of tolerance.

The editor 200 enters the function 386 at a state 509. Proceeding to a state 510, the least squares error curve fit sums are updated. Then, at a state 514, line fit parameters are recomputed by first calculating the non-normalized slope of the line fit information and then normalizing the slope vector and computing the centroid of the points. The new slope vector is pointed in the correct direction, that is, the same general direction of the old slope. Then control follows the path from the state 514 to a state 518 where global line fit information is updated. Although the above discussion makes specific reference to lines, one skilled in the art could generalize the function to include other geometric entities.

The updating step includes constructing a new end survey point using the newly computed slope and the reference point of the last survey point at each end. Then, end points are constructed for the line fit data. These points lie on the fit line and are even with the last survey points on either end of the curve. The function of function 386 then terminates at a state 520.

FIGS. 10a, 10b, 10c, 10d illustrate the "attempt to cross or jump over deviation" function 390 of FIG. 4. The editor 200 enters function 390 at a state 521 and proceeds to a state 522. The state 522 is used to properly set up the survey point list when a closed loop is detected. If a "loopback" condition is detected in the edge status saved by each edge follower, the state 522 sets both curve end status words to "stopped," and the function 390 terminates at a state 524.

If a loopback condition is not detected, the editor 200 proceeds in function 390 by taking a path to a state 526 where a "lookahead" is performed for edge flaring or backtracking, and the results of the lookahead are saved. Again, but this time based on the lookahead, a check for a loopback condition is made at a state 530. If a loopback condition is detected then the function 390 terminates at a state 532. On the other hand, if no loopback is detected then a path is taken to a state 534 to determine whether the survey point list is full. If the survey point list is not full, then a curve fit error is estimated at a state 538. A test for a backtrack condition is made at a state 542. If the test is unsuccessful, then a test is made at the edge ends for a "simple extension" at a state 546. The edges are also tested to be smooth and parallel at a state 550. If the test is successful, then the edge followers 378 (FIG. 5) are allowed to be restarted at the termination points. The curve fit error is checked to be within tolerance, defined by a minimum and maximum error, at a state 554. Assuming that the fit is within tolerance, then the curve end status is set to "running" at a state 558. Finally, global information is prepared for extending the opposite end of the curve at a state 562 before terminating the function 390 at a state 564.

Returning to the flow of control at the state 550, if the edges are not smooth and parallel then the editor 200 moves to a state 566 (FIG. 10*b*) where a test is made to determine whether the survey point list is full. (The same control flow is followed under the conditions indicated in FIG. 10*a* from the states 542, 554.) If the list is not full, the editor 200 proceeds to a state 570 where a test is made to determine if this end has never "paused", a status indicative of a temporary stop, and to test whether the other end has not "stopped". If the test condition is false, then a test is made at a state 574 to determine whether a corner has been detected. If a corner is not detected, then another test is made at a state 578 (FIG. 10*c*) to determine if the curve fit tolerance (error) has been exceeded. If the condition is not satisfied at the state 578, then at a state 582 the editor 200 queries whether the intersection crossing feature is enabled, e.g., toggle 276 in FIG. 2*b*. If so, then a search is conducted beyond the obstruction for a line continuation at a state 584 (Iv$_{13}$isect.c; FIG. 11). Then, at a function 586, a test is made to determine if the intersection crossing has succeeded. If the condition holds, then a path is taken to a state 590 where the end status is set to "running". A transition is then made by the editor 200 to a state 594 (FIG. 10*d*) to prepare global information for extending the opposite end of the curve and the function 390 terminates at a state 596.

The editor 200 takes an alternative flow of control from the state 534 (FIG. 10*a*) when the survey point list is full, in which case a path is taken to a state 598 where the end status is set to "stopped". This is followed by transition to a state 602 (FIG. 10*d*) where information is saved to the separate surveyed portion of the raster blob under consideration. The editor 200 then moves to state 594 to prepare global information for extending the opposite end of the curve, and terminates at the state 596. Similarly, referring to FIG. 10*b*, if the survey point list is full at the state 566, then some unexpected condition causes the end status to be set to "stopped" at a state 606. If this end never paused, and the other end is not stopped at the state 570, then the end status is set to "paused" at a state 610 in preparation to breakout from deviation processing by transferring control to the other end of the raster entity. However, the editor 200 performs no corner or intersection processing until an extension at the other end of the current line is first attempted.

Figure 10A:
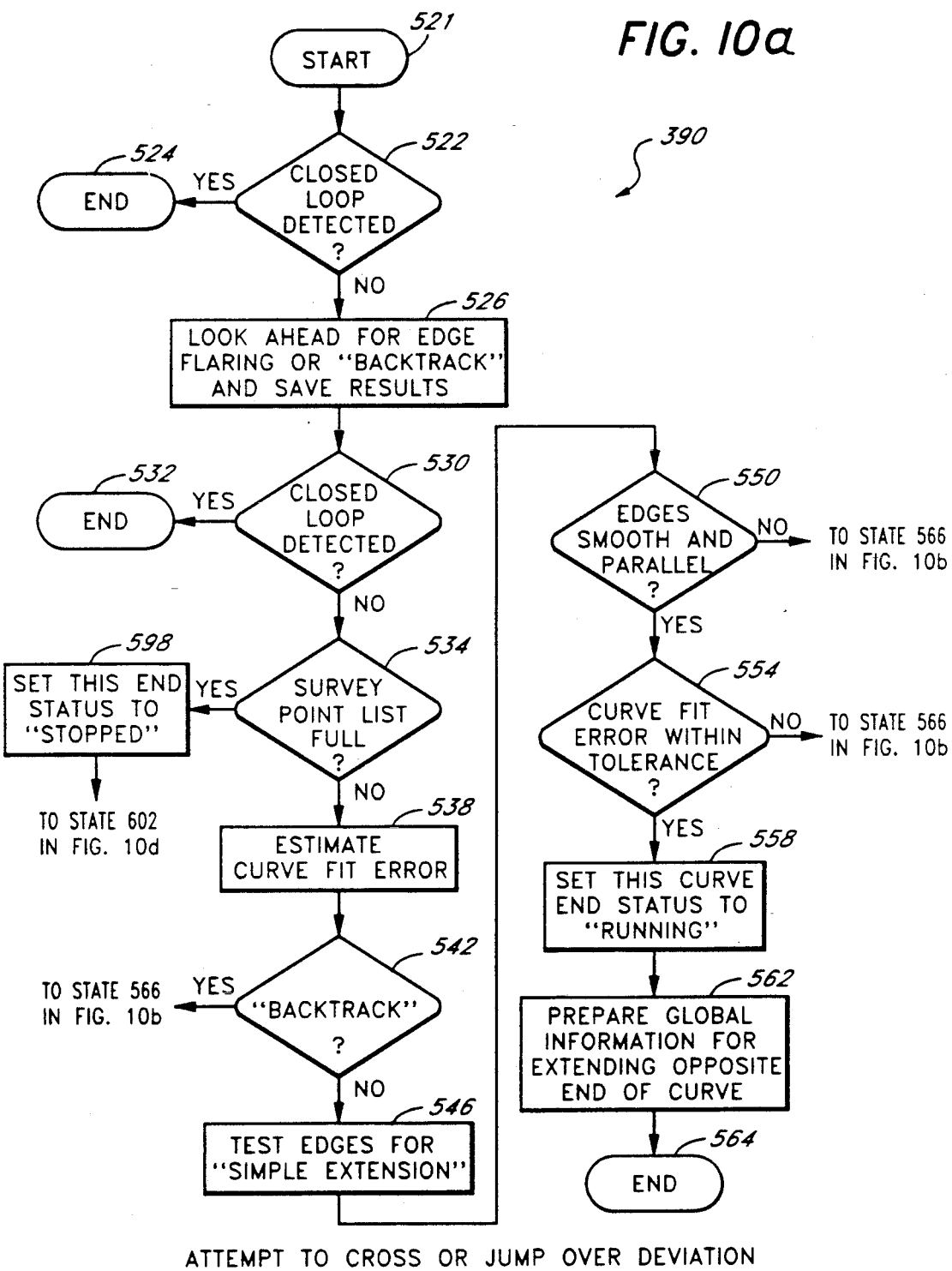
FIGS. 10a, 10b, 10c and 10d collectively illustrate a flow diagram defining the "attempt to cross or jump over deviation" function referred to in FIG. 4.
Figure 10B:
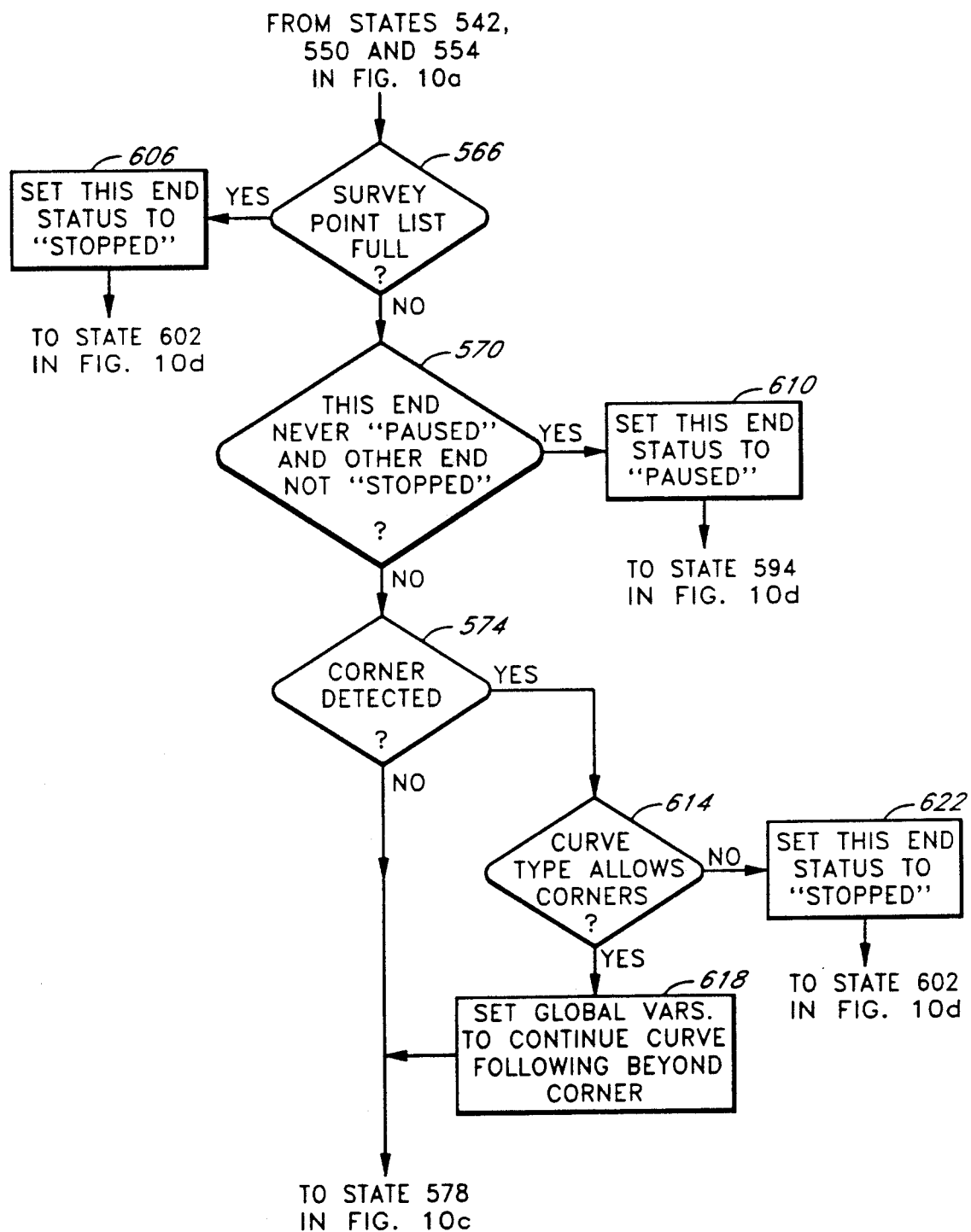
Figure 10C:
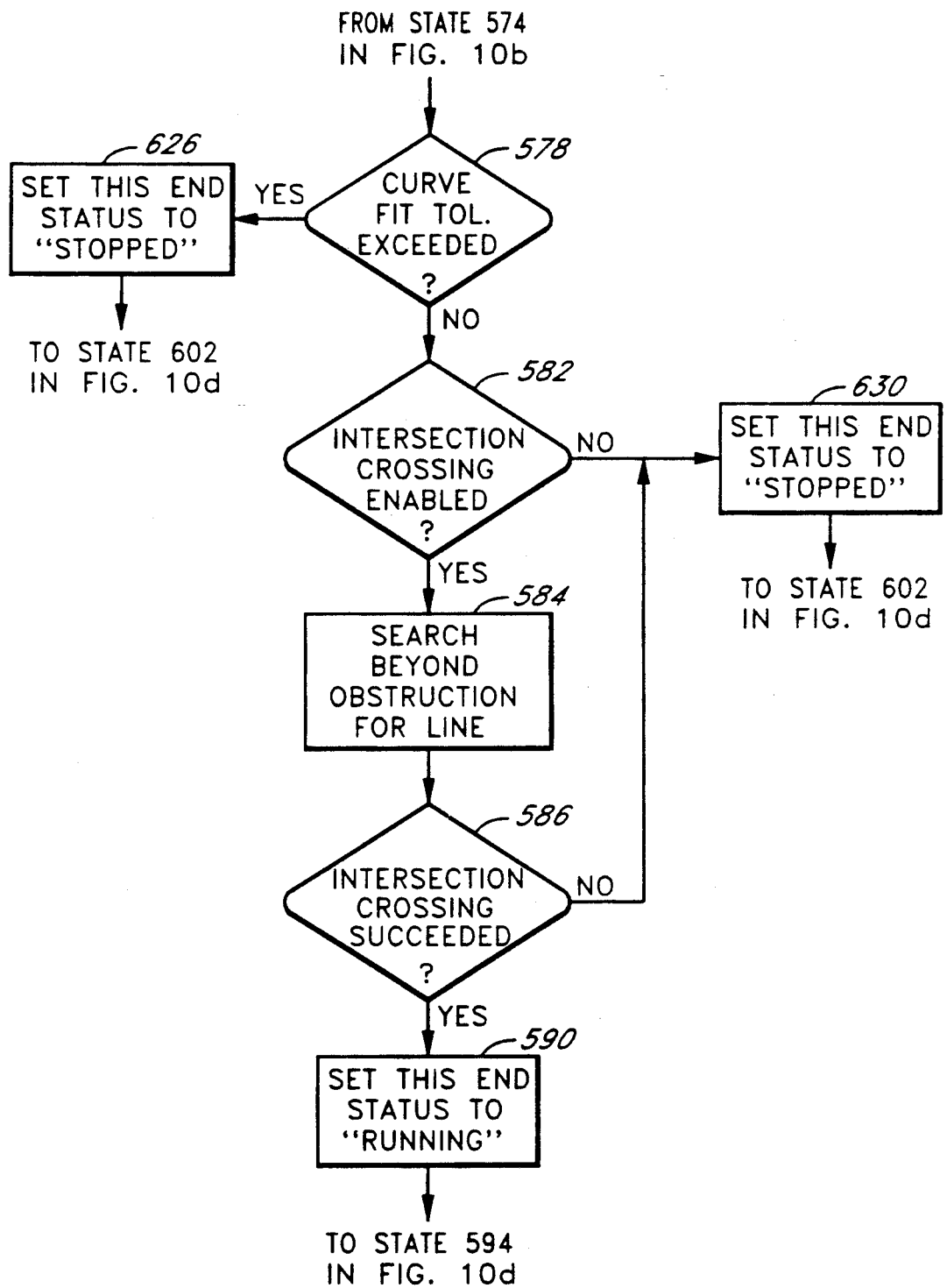

In the alternative path from the state 570 of FIG. 10*b*, a corner test is made. A corner is detected by observing that both edges cross the same flare line. If a corner was detected at the state 574 then a path is taken to a state 614 to determine whether the curve type allows corners, e.g., a polyline. If corners are allowed (currently only if the user has selected a polyline entity), then a transition is made to a state 618 to set the global variables to continue the curve following beyond the corner then control returns to the state 578 (FIG. 10*c*). Otherwise, a path is taken from the state 614 to a state 622 to set the end status to "stopped".

Figure 10D:
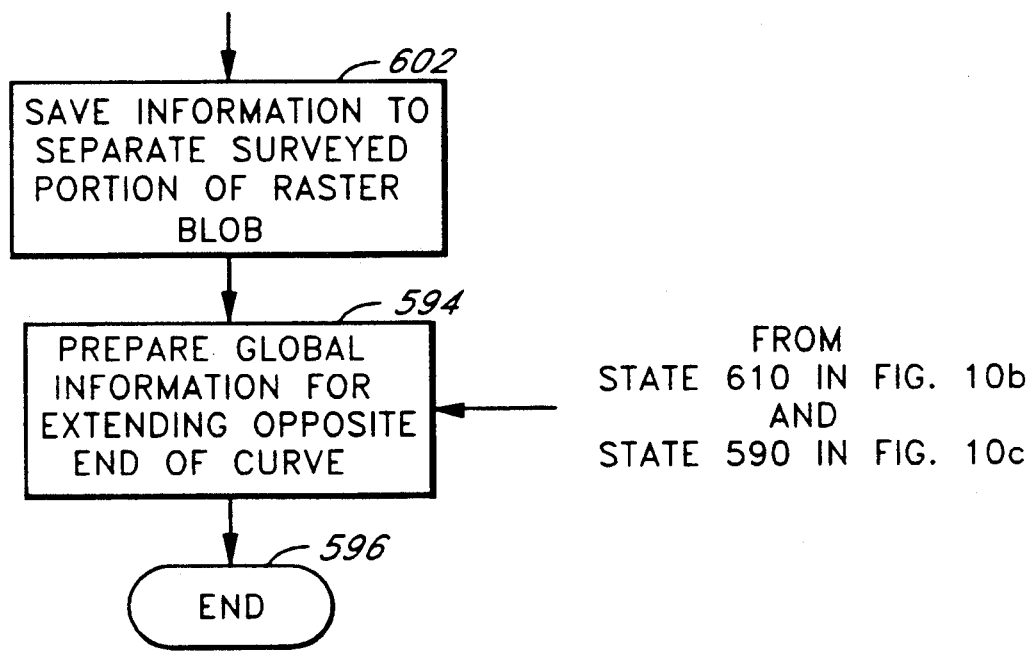

Referring now to FIG. 10*c*, it is seen that if in the state 578 it is found that the curve fit tolerance is exceeded, then the line is too wavy to track and the editor 200 moves to state 626 and sets the end status to "stopped". The editor 200 then moves to the state 626 and sets the end status "stopped". The editor 200 then moves to the state 602 (FIG. 10*d*). State 602 is also entered after the test at the state 582 fails and the end status is set to "stopped" at a state 630.

Figure 11A:
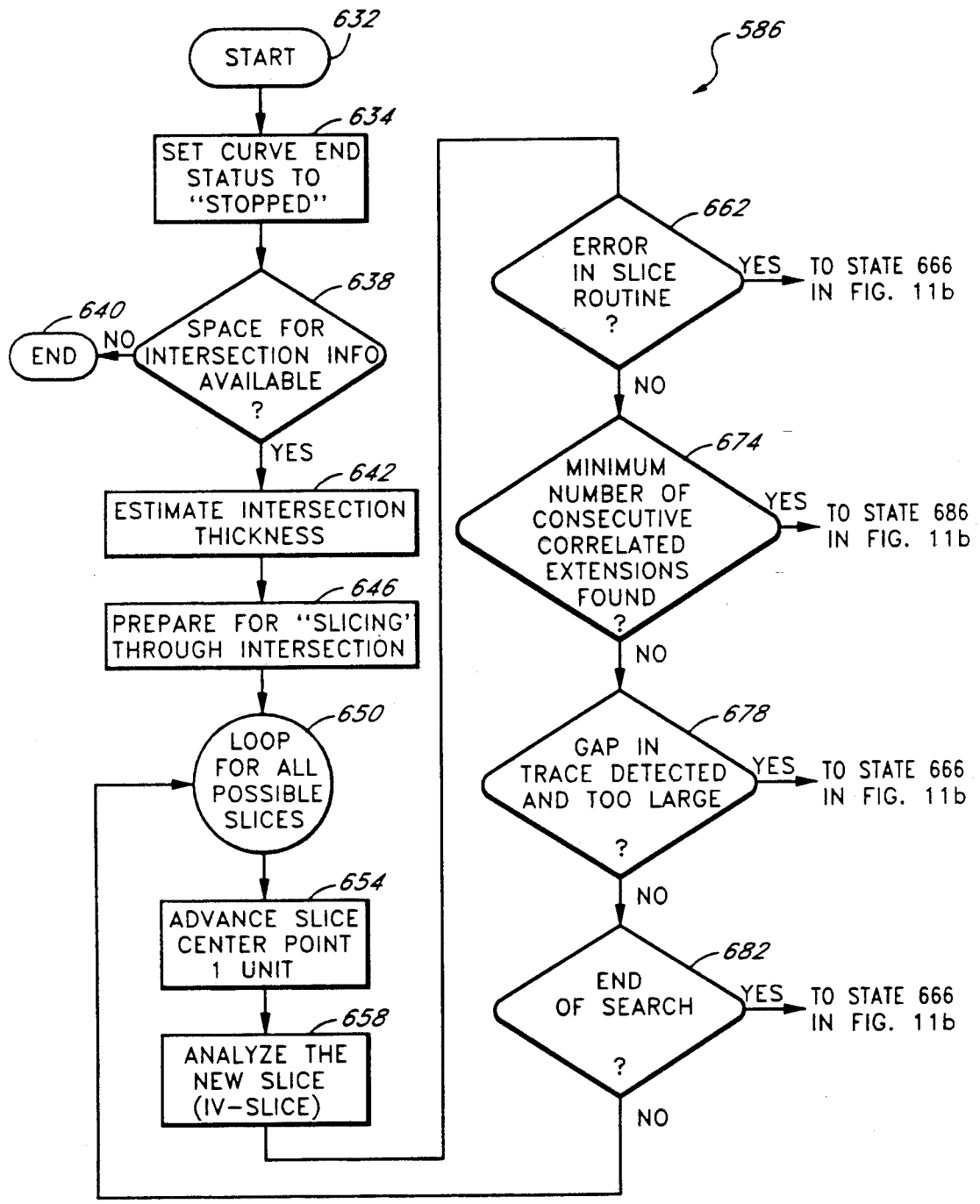
FIGS. 11a and 11b collectively illustrate a flow diagram defining the "attempt intersection crossing" function referred to in FIG. 10.

FIG. 11*a* illustrates the control flow for the "intersection crossing" function 586 of FIG. 10*c*. At a state 634 the curve end status is set to "stopped". An assumption is made that the line has stopped at this end of the raster entity because there are many ways to fail at an attempted intersection crossing. The state 634 is followed by a state 638 where an attempt is made to allocate space for intersection information. If intersection information space cannot be allocated, meaning that the total number of intersections crossed for the current entity has reached a maximum, then the function 586 terminates at a state 640. Otherwise, the editor 200 proceeds to a state 642 where the thickness of the intersecting line is estimated. It is assumed that the obstruction is a line having the same width as the current raster entity. The intersection angle is assumed to be acute. The length of the intersection, L, (assuming both lines have width W) is given by the following equation:

$$L = W * (1/\sin(A) + \cos(A)/\sin(A))$$

where A is the angle (less than or equal to 90°) of the intersection.

At a state 646, the editor 200 prepares for "slicing" through the intersection by initializing certain variables according to the type of entity that is presently under consideration, i.e., the canonical entity selected by the user.

A slice is a cross-section of the selected raster entity. By creating and analyzing a number of slices between the end of the line, where the status was set to "stopped", and the intersecting obstruction, the general "shape" of the intersection is determined. The number of slices analyzed will be dependent upon editor design and the particular image and entity dimensions under consideration. In slicing through the raster obstruction, the editor 200 searches for "off-on" pixel transitions that are possible continuations of the entity past the obstructing intersection. The possible continuations for each slice are saved in an array for further processing. The saved information includes the edge pixels and the center pixel included by the slice. The slicing begins at the last survey point, and it proceeds from there in the orientation of the reference slope according to the type of entity that was selected by the user.

A search for the extension begins at a state 650 which corresponds to one end of a FOR-loop, bounded at the other end at a state 682. The FOR-loop is terminated when a predetermined maximum number of slices is reached or when a continuation is found. The length of the slices increase as the algorithm proceeds, so that a "conical" slice pattern is formed across the grain of the current raster entity. At a state 654 the slice center point is advanced by one unit, or pixel. The new slice is analyzed at a slice analysis function 658 (function Iv$_{13}$ slice() in Ibuild$_{13}$ trace.c; FIG. 12). If there is an error in the function 658, checked at a state 662, then the editor 200 moves to a state 666 illustrated at FIG. 11*b* and frees temporary memory space. The editor 200 then moves to a state 670 and returns a failure code before terminating at a state 672.

If in the state 662 (FIG. 11*a*) no error is detected in the slice routine of the function 658, then control moves to a state 674 where the editor 200 determines whether a minimum number of consecutive slices were correlated into at least one possible extension or "trace". If such a trace was found, the editor 200 moves to state 666 (FIG. 11b) and functions as described above. If no trace was found, then a transition is made to a state 678 wherein the editor 200 determines whether a gap in the trace was detected and if the gap is too large to continue processing. If such a gap was found, the editor 200 moves to state 666 (FIG. 11b) and functions as described above. If no such gap is detected in the state 678, then the editor 200 moves to a state 682 and determines whether this is the end of the search for all possible slices. If it is the end of the search, the editor 200 moves to state 666 (FIG. 11b) and functions as described above. If it is not the end of the search, then the editor 200 returns to the top of the FOR-loop at the state 650 to process the next slice. If the entity could not be extended, due to a gap, for example, then the user may choose to intervene with the EXTEND function as shown in the menu 290 (FIG. 2c).

Returning to the state 674, if a valid trace (or extension) is found, then the editor 200 moves to a state 686, illustrated in FIG. 111b, where a test is made to determine whether the edge points on the extension are valid. The validity of the edge points is tested by gathering more edge points with the edge follower functions 378 (FIG. 5) and then checking that the edges are parallel and point in the same direction. If the edge points are not valid, then the editor 200 moves from state 686 to the state 666 and functions as described above. If, on the other hand, the edge points on the extension are valid, then the editor 200 moves from the state 686 to a state 690 and creates a survey point at the start of the extension. The new survey point is placed beyond the intersection at the midpoint of the two edge restart points. It is given the slope of the final search direction. Thereafter, a state 694 is entered where intersection information is saved for separating the surveyed curve from the intersecting raster blob. For an example of a single intersecting line, intersection information includes the placement of four "intersection points" at "off" pixels near each intersection vertex.

The editor 200 in function 586 next moves to a state 698 and determines whether a gap has been detected. If a gap was detected in the state 698, then the editor 200 moves to a state 702 and determines whether the gap is "clean". The gap is clean if there are no intersecting lines at the gap such as, for example, a "T"-intersection, which is treated as a gap that does not have an intersecting line. The gap will be crossed only if the test at a state 702 is satisfied. The test of the state 702 is implemented by ensuring that there is no flaring at the line edges. If intersecting lines are detected in the state 702, then the function 586 terminates by moving to the state 666 and functioning as described above. Otherwise, if the gap is "clean", then the editor 200 moves to a state 706 wherein the survey point and intersection information are appended to a permanent list. This permanent list preserves survey point and intersection information for the duration that the current raster entity is being manipulated.

The editor 200 next moves to a state 710, wherein the clockwise and counterclockwise edge followers 378 (FIG. 5) are set up to continue on the extension. Then, at a state 714, the current end status is set to "running". At a state 718, a "success" status is returned from the function 586, indicating that an intersection has been crossed, or that a gap has been jumped, and that the entity may now continue to be extended. The function 586 then terminates at a state 720.

Figure 12A:
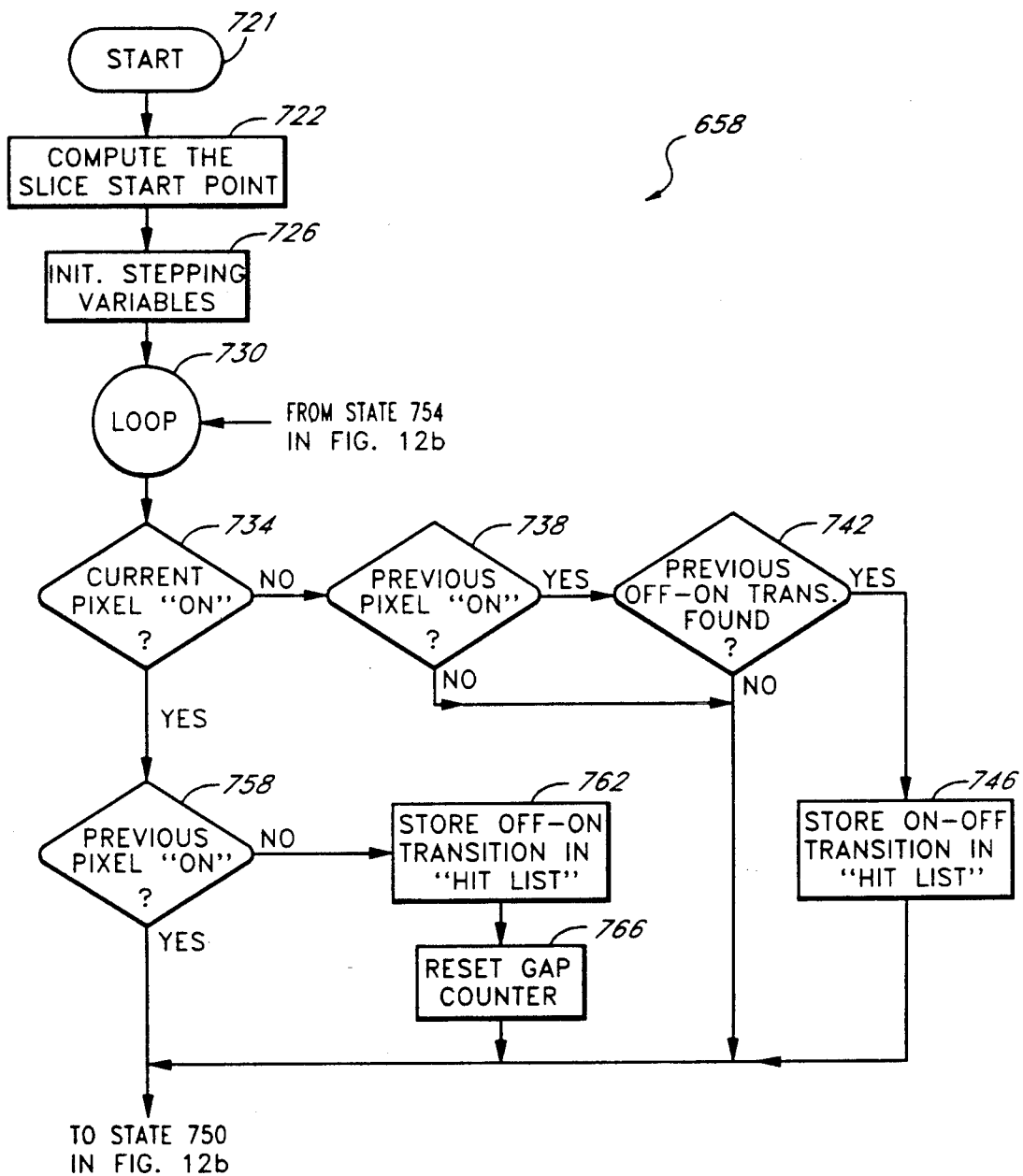
FIGS. 12a and 12b collectively illustrate a flow diagram defining the "analyze new intersection slice" function referred to in FIG. 11.
Figure 12B:
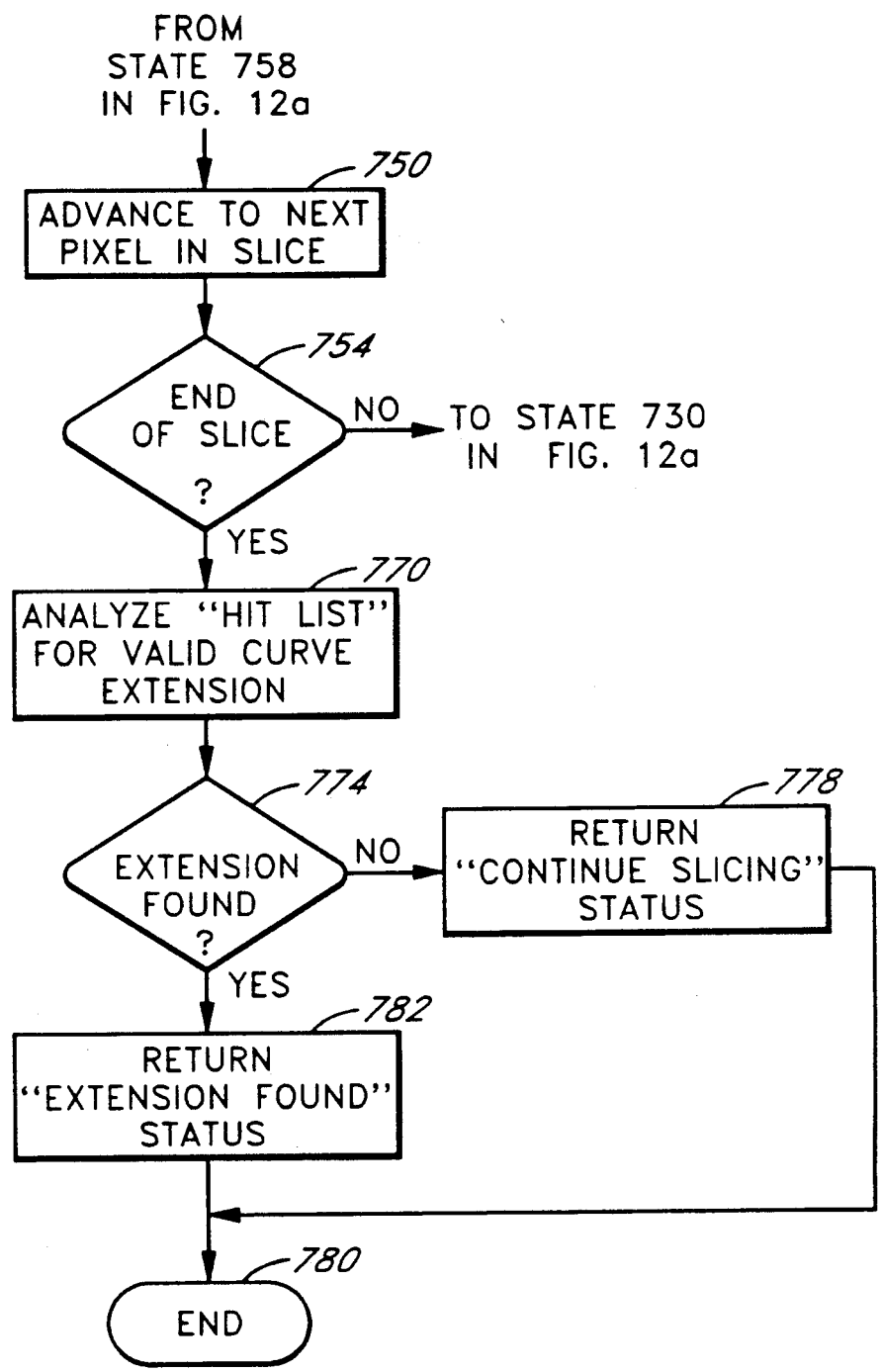

FIGS. 12a and 12b illustrate the control flow for the "analyze new intersection slice" function, generally indicated at 658, corresponding to function 658 illustrated in the flow diagram of FIG. 11a. The function 658 is also called a scan line algorithm since each slice is created perpendicular to the local direction of the current raster entity, much like a video scan line. The function 658 begins at a state 721 and moves to a state 722 which determines the start point of the current slice from which the slice endpoints are derived. A number of stepping variables are initialized at a state 726 before entering a DO-WHILE-loop beginning at a state 730, which searches the current slice a pixel at a time. The intent of the DO-WHILE-loop is to build up transition pixel pairs in a "hit list". Naturally, such pairs are either "on-off" or "off-on". Hence, the termination of the intersection is reached when a combination of an "off-on" and "on-off" pixel pair is encountered by the slice search.

The DO-WHILE-loop transitions first to a state 734 where a test is made to determine if the current pixel is "on". The current pixel is the pixel of the slice undergoing analysis. The first time through the DO-WHILE-loop this pixel represents the start point found in state 722. If the current pixel is "off" then a transition is made to a state 738 where a test is made as to whether the previous pixel is "on". If so, then control proceeds to a state 742 which tests whether a previous "off-on" transition was found. If the results of the test 742 are affirmative, then control transitions to a state 746 where the "on-off" transition is stored in the "hit list". A pointer is advanced to the next pixel in the slice at a state 750 (FIG. 12b) and the end of the loop is reached at a state 754 which tests whether there is an end of slice condition. Assuming no end of slice then control returns to the top of the DO-WHILE-loop at the state 730 (FIG. 12a).

Now, taking an alternative path inside of the loop from either the state 738 or 742 in FIG. 12a, where a condition has failed control transfers immediately to advancing to the next pixel in the slice at the state 750. If the results of the test at the state 734 are affirmative, that is, the current pixel is "on", then control transfers to a state 758 which tests whether the previous pixel is "on". If the results of this test are affirmative then control transfers to the state 750. Otherwise, the transition is made from the state 758 to a state 762 to store the off-on transition in the "hit list". This state is followed by a state 766 wherein the gap counter is reset and operation then proceeds to the state 750.

Figure 13:
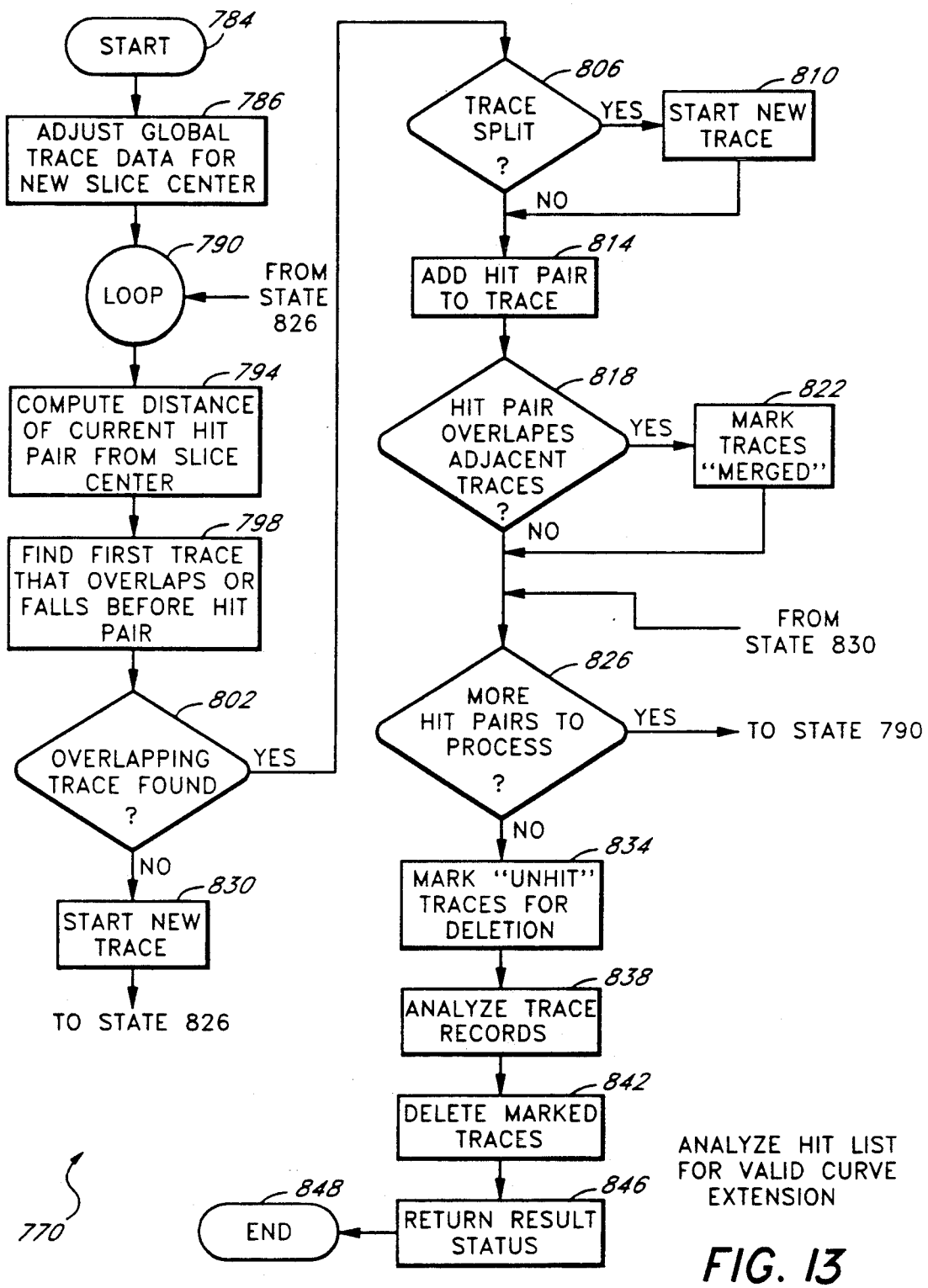
FIG. 13 is a flow diagram defining the "analyze hit list for valid curve extension" function referred to in FIG. 12.

Now, when the DO-WHILE-loop has completed by finding the last pixel in the slice at the state 754, control transfers to a function 770 (Ibuild$_{13}$ trace.c; FIG. 13) wherein the "hit list" is analyzed to locate a valid curve extension. A valid curve extension is found if a minimum number of transitions are correlated. After analysis is completed in function 770, control moves to a state 774, which queries whether an extension was found. If no extension was found, control moves from the state 774 to a state 778 wherein a "continue slicing" status is returned by the function 658. If it is determined in the state 774 that an extension was found, then control moves to a state 782, wherein an "extension found" status is returned. Control then moves to the state 782 wherein operation of the algorithm 658 is terminated.

Referring now to FIG. 13, the control flow for the "analyze hit list for valid curve extension" function is generally indicated at 770, which corresponds to function 770 of FIG. 12b. The function 770 takes the most recent hits found in the current slice and updates the trace structure to reflect the changes. The hits must be ordered by increasing cross product. The editor 200 enters the function 770 at a state 784 and moves to a state 786, wherein global trace data is adjusted for the new slice center. This means that the movement of slices is corrected, and slices that appear to be correlated are collected. A transition is then made to the beginning of a FOR-loop indicated at a state 790. The FOR-loop is constrained by the number of pairs of hits, i.e., "off-on" and "on-off" transitions. At a state 794, the distance of the current hit pair from the slice center is determined. This calculation is accomplished by computing the cross product of the vector formed by the hit pair and the slice reference line. Control then moves to a state 798, wherein the function 770 sequences through the active trace record list until either the hit pair overlaps the projected trajectory of a trace record or the hit pair is positioned after the current trace or hit pair. A trace record will comprise sequences of hit pairs collected in previous slices. Therefore, a hit pair that overlaps a projected trace trajectory must be a continuation of the same trace curve.

From state 798, control moves to a state 802, wherein it is queried whether an overlapping trace has been found. If an overlapping trace has been found, then a transition is made to a state 806 wherein a test is made to determine whether the trace splits into two traces, which is geometrically interpreted as a "Y"-intersection. The test is accomplished by determining if there are two hits in the current slice that correlate with a single hit in the previous slice. The test at the state 806 succeeds when two overlapping hit pairs match a single hit pair that was found in a previous slice. If the test 806 succeeds, a new trace is started at a state 810 with one of the hit pairs. From state 810 or, if the trace split test did not succeed, from the state 806, control proceeds to a state 814 where the current hit pair is added to the overlapping trace.

A test is made at a state 818 to identify a trace merge, or determine whether the current hit pair overlaps adjacent traces or two hit pairs in a previous slice. The test at the state 818 is essentially the inverse of the test for a trace split. For example, if there is a single hit in the current slice that correlates with two hits in the previous slice, then the two traces should be merged into one. Assuming that an overlap condition is found in the state 818, control then moves to a state 822, wherein the traces are marked as "merged". From state 822, or, if the result of the test in state 818 is negative, from the state 818, control moves to a state 826 wherein a test is conducted to determine if there are more hit pairs to be processed. If the result of the test is affirmative, then control returns to the top of the FOR-loop at the state 790 where the next hit pair is processed.

Returning to the state 802, where the test is made for an overlapping trace or split condition, if such a trace is not found then a transition is made to a state 830 wherein a new trace is started. From the state 830, control passes to the state 826 where the FOR-loop is continued.

Figure 14:
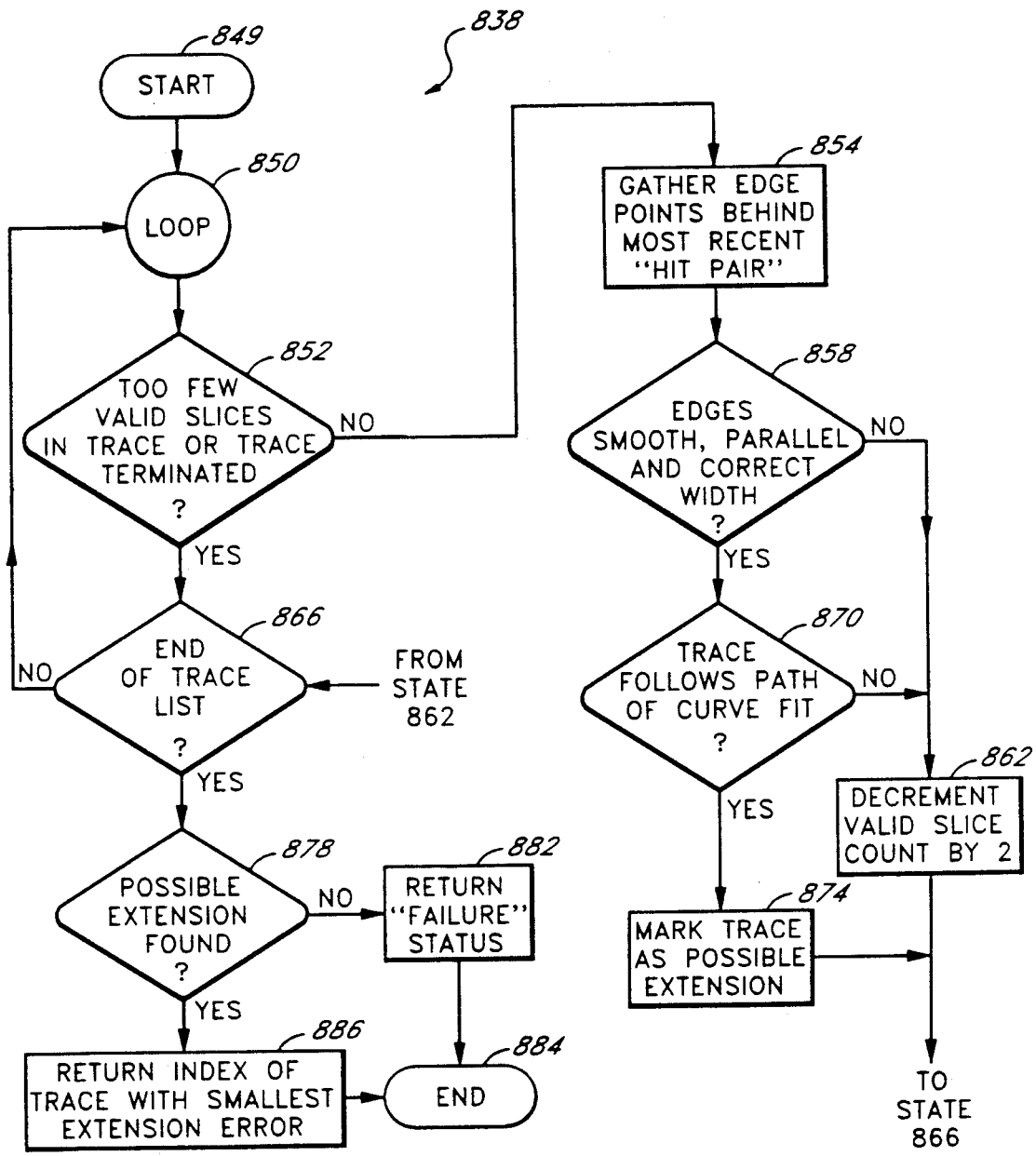
FIG. 14 is a flow diagram defining the "analyze trace records" function referred to in FIG. 13.

When the FOR-loop terminates at the state 826, because there are no more hit pairs to process, control proceeds to a state 834 where "unhit" traces, or traces that have not been updated with a hit pair by the current slice, are marked for deletion The trace records are then analyzed at a function 838 (function sTestTraces() in Iv$_{13}$ isect.c; FIG. 14), and traces that are marked as "unhit" are deleted at a state 842. The result status of the function 770 is returned at a state 846 which either indicates that a valid extension has been found or indicates failure because the gap is too large to jump. From the state 846, control moves to a state 848 and operation of the function 770 is terminated.

The function for the "analyze trace records" function 838 of FIG. 13 is illustrated in FIG. 14, and generally indicated at 838. The editor 200 enters function 838 at a state 849 and moves to a state 850 where a FOR-loop begins and is activated for each active record in a trace list. From the state 850 control moves to a state 852 where a test is made to determine whether there are too few consecutive slices, or hit pairs, or if a trace has terminated. If neither of these conditions are met, then an attempt is made to extend the trace further by taking a path to a state 854.

In the state 854, edge points are gathered by directing the edge followers 378 (FIG. 5) backwards behind the most recent "hit pair". Control then moves to a state 858 wherein a test is made for smooth edges, parallel edges and correct width. The method used in this test corresponds to that described for states 308 and 320 of FIG. 3a. If the result of the test in the state 858 is negative, then control moves to a state 862 wherein the valid slice count is decremented by two. If the number of consecutive slices required by a trace is decremented in this manner, the amount of trace processing is reduced because the smoothness and parallel fit tests need not be repeated each time the function 838 is executed. The editor 200 then moves from state 862 to a state 866. The FOR-loop is tested for termination at the state 866, i.e., whether there is an end of active trace list condition. If not, then the loop continues back at the state 850.

If the result of the test path in state 858 is affirmative, control moves to a state 870 wherein a test is conducted as to whether the trace trajectory, or slope, matches that of the current raster entity. If not, then a transition is made to the state 862 to again limit trace processing. If the trace is aligned with the entity under consideration, that is, the test at the state 874 succeeds, then the trace is marked as a possible extension at a state 874 and control returns to the FOR-loop test at the state 866.

Once outside of the FOR-loop, due to the end of trace list processing, control moves from the state 866 to a state 878 where a test is made for whether at least one possible entity extension has been found. If the outcome of the test in the state 878 is negative, then a "failure" status is returned from the function 838 at a state 882 and the function of function 838 terminates at a state 884. Otherwise, the index of the trace with the smallest extension error, that is, error in slope and fit, is returned at a state 886 from the algorithm 838. Following completion of operation in either of the states 882 or 886, performance within function 838 terminates.

The function for the "erase entity from raster image" function 236 of FIG. 2a is generally indicated at 236 in FIG. 15. The function at the function 236 is called into operation once a vector or raster entity has been approved by the user for deletion. Beginning at a state 888, the erase entity function 236 clips off the entity from the surrounding raster at the predetermined "cut lines". Moving to a function 890 (IvIntCut.c; FIG. 16), the selected entity is cut away from the intersecting raster objects. Remaining cuts are performed on the selected entity at a state 894. Remaining cuts are cuts made for out-of-tolerance situations such as, for example, a "T"-intersection or a survey point overflow condition. Finally, the isolated segments of the selected entity are erased at a state 898 and the function 236 then terminates operation at a state 900. The function 236 requires only the location of one "on" pixel to erase any raster blob.

Figure 11B:
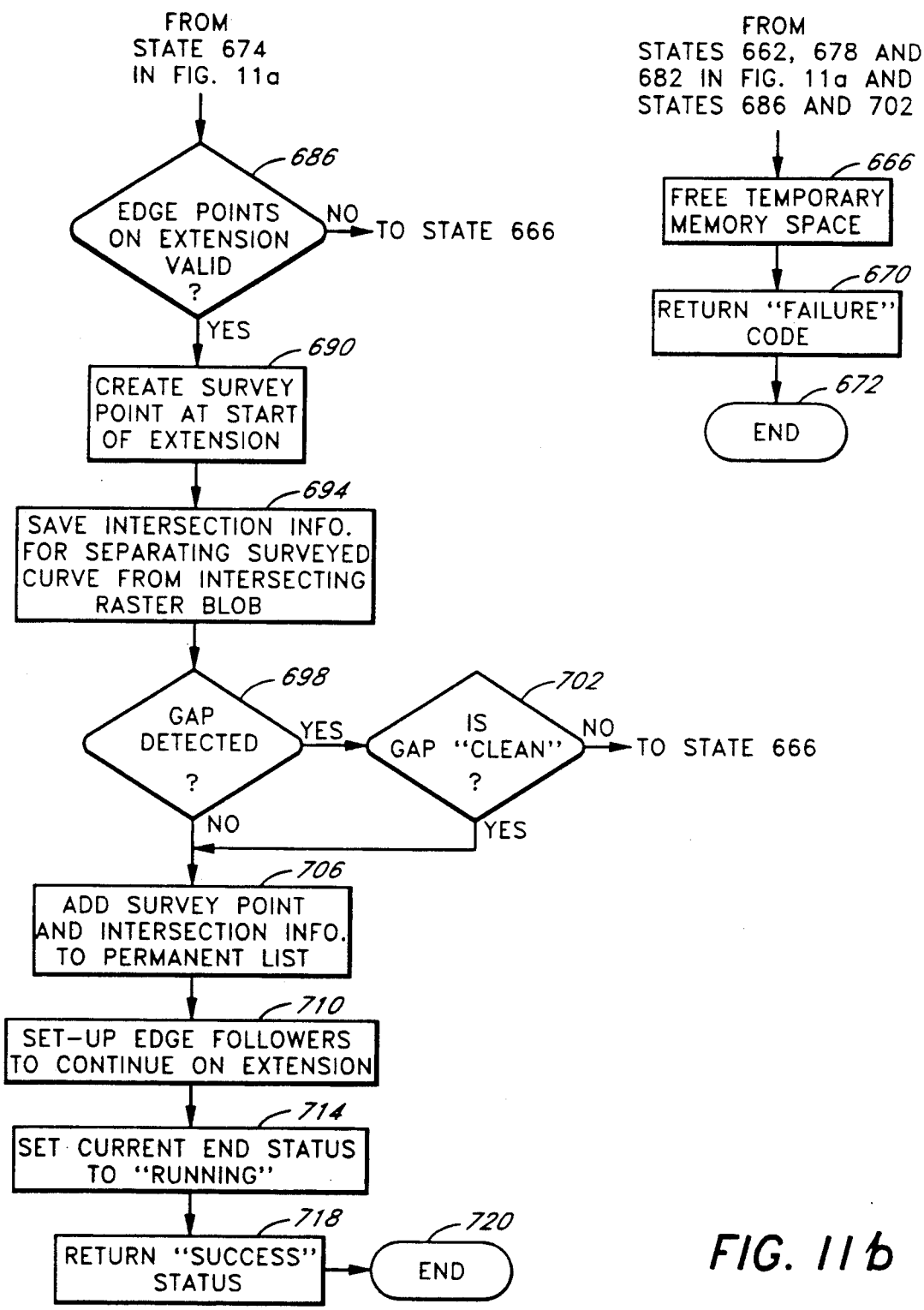
Figure 16A:
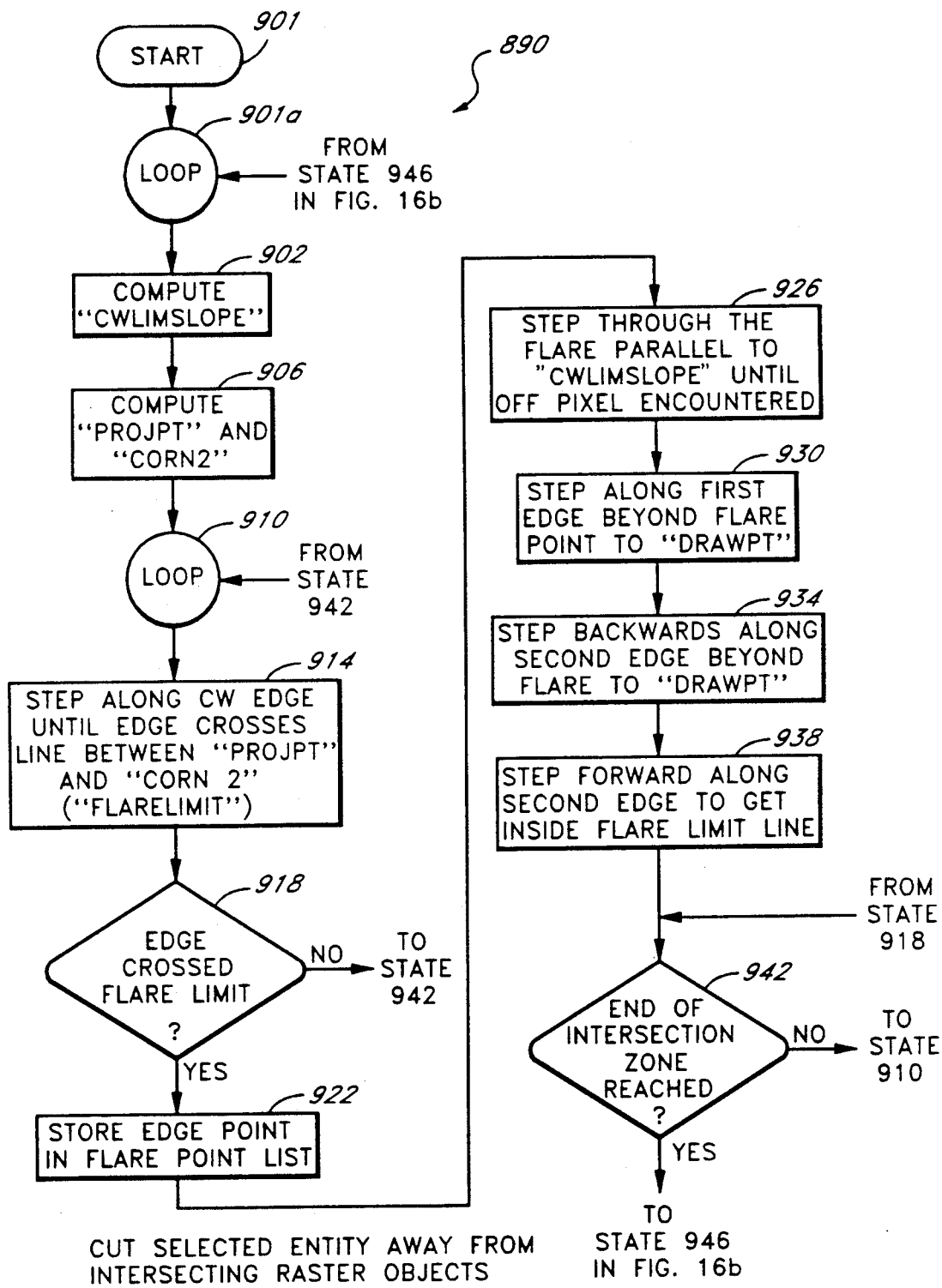
FIGS. 16a and 16b are collectively a flow diagram defining the "cut selected entity away from intersecting raster objects" function shown in FIG. 16.
Figure 16B:
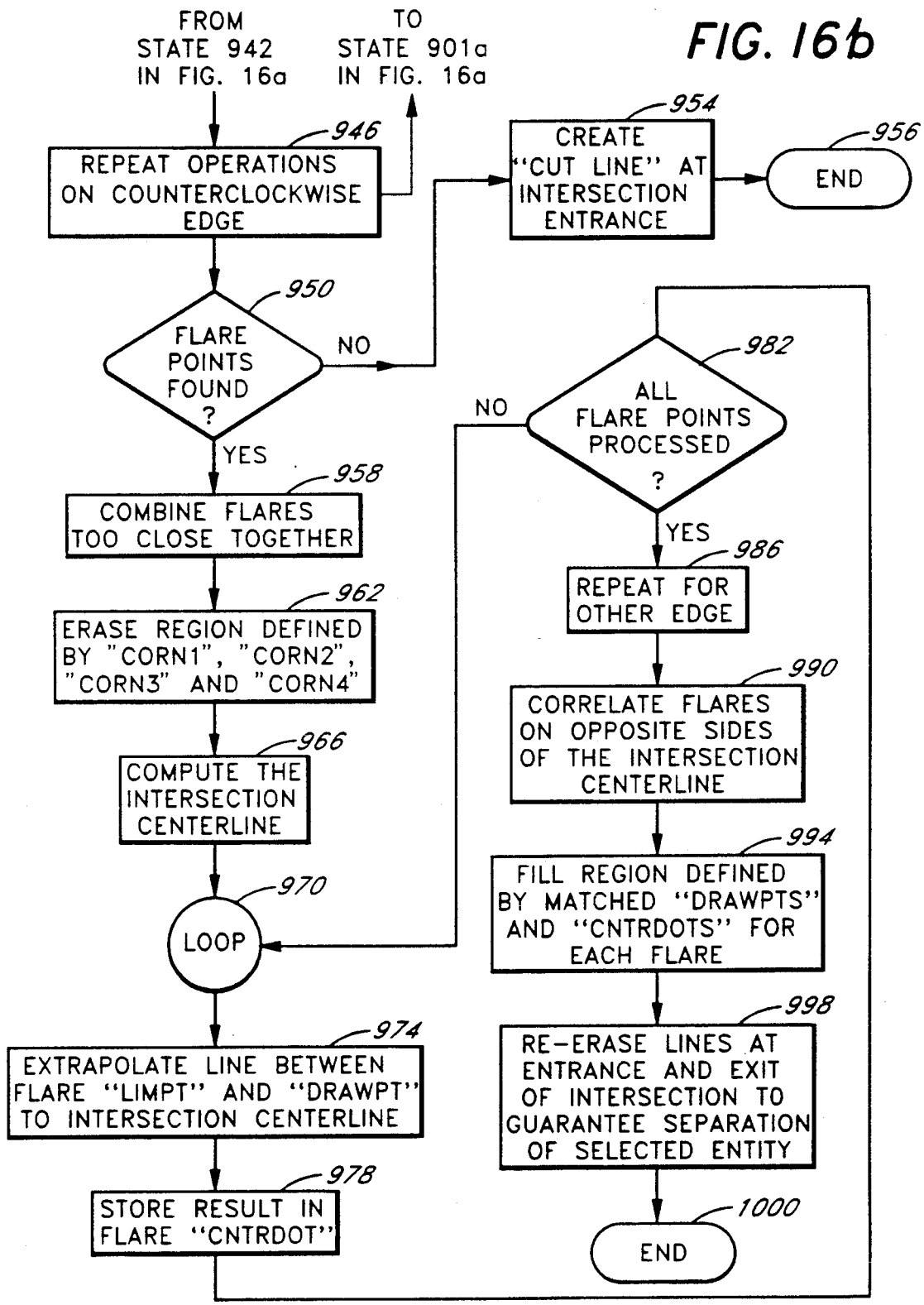

The function used to "cut the selected entity away from intersecting raster objects" of FIG. 15 is generally indicated at 890 in FIGS. 16a and 16b. Beginning at a state 901, the function 890 is responsible for reconstructing the bridge over the "obstruction zone" that was made by the intersection/gap jumping algorithm 586 (FIGS. 11a and 11b). The function 890 makes entries for a "cut line" list for the current curve end as required by the geometry of the obstruction. The editor 200 moves to a state 901a and then a state 902 wherein the clockwise line middle slope known as "cwlimslope" is determined. The value of "cwlimslope" is the slope of the line between the x-y clockwise intersection start point, "xyCWIntStart", (or last survey point before the intersection) and the x-y clockwise intersection end point, "xyCWIntEnd", (or first survey point after the intersection). Control then moves from the state 902 to a state 906 which determines a pair of clockwise projection points, "projpt". These projection points are stored as the corner points "corn1", and "corn2". The corn1 point is a point on the clockwise edge flare line that is perpendicular to the "xyCWIntStart" point. The "corn2" point is a point on the clockwise edge flare line that is perpendicular to the "xyCWIntEnd" point.

A DO-WHILE-loop begins at a state 910. Within the DO-WHILE-loop, a state 914 provides for stepping along the clockwise edge of the selected raster entity until the edge crosses the clockwise flare limit line between "projpt" and "corn2". Once such an edge crossing is identified, control moves to a state 918 wherein it is determined whether the edge crosses the flare limit. If the result of the test in state 918 is affirmative, then control moves to a state 922 where the edge point, called "cwFlarelimpt0" or clockwise flare limit point 0, is stored in a flare point list.

The flow of control then continues to a state 926 which steps through the flare line, parallel to the "cwlimslope" edge line until an "off" pixel is encountered. Then, at a state 930, the clockwise edge follower 378 (FIG. 5) steps along the first edge of the intersecting raster object, beyond the flare line, to a clockwise draw point called "drawpt0". Thereafter, control moves to a state 934 wherein the clockwise edge follower 378 steps backwards along the second edge of the intersecting object, beyond the flare line, to another clockwise draw point called "drawpt1". Control then moves to a state 938 to step forward along the second edge to get inside the flare limit line. The state 938 ensures that "cwFlarelimpt1" is below the flare line.

From a result of no edge crossed flare limit at the state 918, and from the state 938, control moves to a state 942 which tests whether the end of the intersection zone, defined by the clockwise and counterclockwise survey points at either end of the intersection zone, has been reached. If the end of the intersection zone has not been reached, as determined at the state 942, then control transfers to the top of the DO-WHILE-loop at the state 910. Otherwise, the loop terminates and a transition is made to a state 946 (FIG. 16b) which moves to state 901a and repeats the states 902-942 of FIG. 16a for the counterclockwise edge.

From the state 946 control moves to a state 950, wherein a robustness test is conducted. If no flare points are found on the edges during the test in the state 950, then control transfers to a state 954 wherein a "cut line" is created at the intersection entrance, defined by the points "corn" or "cwprojpt" and "xyCCWIntStart", for a later retraction and the function 890 then terminates at an end state 956. On the other hand, if the flare points are found during the test in the state 950, then control moves to a state 958 in which flares that are too close together are combined into a single, wider flare. From the state 958, control moves to a state 962, wherein the region defined by "corn1", "corn2", "corn3", and "corn4" is erased. The intersection centerline is then computed at a state 966.

A FOR-loop controlled by the number of flares is initiated at a state 970. Control then moves to a state 974 wherein the line between each "Flarelimpt" and "drawpt" is extrapolated to the intersection centerline. The resulting termination point for each extrapolation is stored in a separate "cntrdot", or center dot, point in a state 978. Control then moves to a state 982 wherein a test is conducted to determine if all flare points have been processed. If the result of this test is negative, then control transfers to the top of the FOR-loop at the state 970 to get the next flare point. Otherwise, the FOR-loop terminates and the same steps in the FOR-loop states 970-982 are repeated for the counterclockwise edge at a state 986.

Thereafter, control moves to a state 990 wherein flares on opposite sides of the intersection centerline are correlated. Moving next to a state 994, the region defined by matched "drawpt's" (draw points) and "cntrdot's" (center dots) for each flare are filled. Finally, at a state 998, lines at the entrance and exit of the intersection, the "cut lines", are re-erased to guarantee a separation of the selected entity. The function 890 then terminates in a state 1000.

Figure 17:
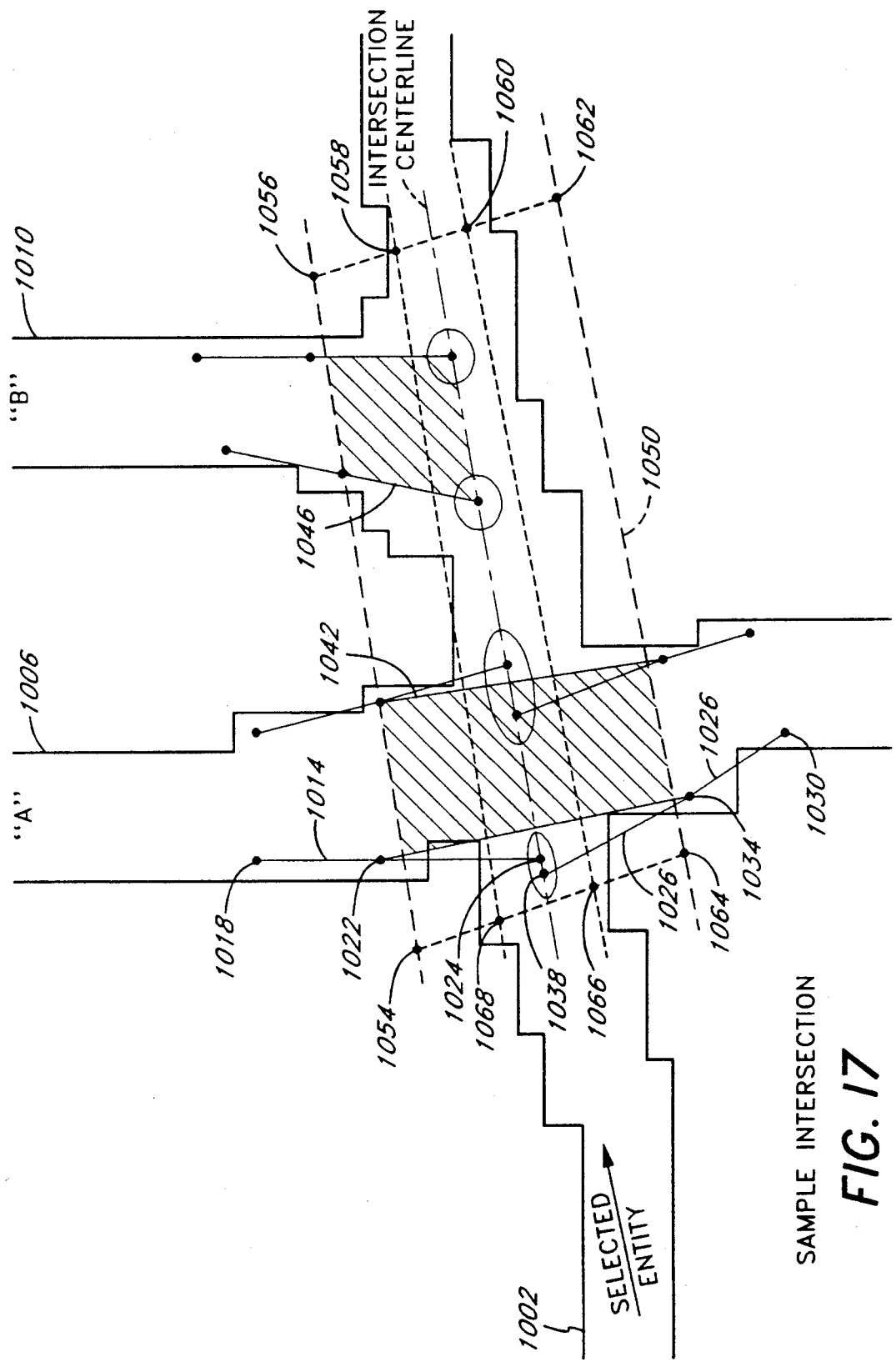
FIG. 17 is a diagram showing an example of erasing a selected raster entity which intersects two raster objects.

FIG. 17 illustrates an example of the selective erasing and cutting of a raster entity as is carried out by the entity cutting function of the function 890 shown in FIGS. 16a and 16b. In FIG. 17, a selected entity 1002 is intersected by an intersecting entity "A" 1006 and an intersecting entity "B" 1010. A first extrapolation line 1014 is estimated from "cwdrawpt0" (clockwise draw point 0) 1018 through "cwFlarelimpt0" (clockwise flare limit point 0) 1022 to a first "cntrdot" (center dot) 1024. A second extrapolation line 1026 is estimated from "ccwdrawpt0" (counter clockwise draw point 0) 1030 through "ccwFlarelimpt0" (counter clockwise flare limit point 0) 1034 to a second "cntrdot" 1038. The two "cntrdot's" 1024, 1038 are then correlated to form a complete edge of a filled area 1042. At the "T"-intersection formed by the intersecting entity "B" 1010 and the selected entity 1002 another filled area 1046 created by the erasure algorithm 890 is shown. The area 1046 is filled by setting the pixel colors to the color of the intersecting entity "B" 1010. The filled areas 1042, 1046 are filled once an intersection zone 1050 bounded by "corn1" 1054, "corn2" 1056, "xyCWIntEnd" 1058, "xyCCWIntEnd" 1060, "corn3" 1062, "corn 4" 1064, "xyCCWIntStart" 1066 and "xyCWIntStart" 1068 is erased. The lines from "corn1" 1054 to "corn 2" 1056 and from "corn3" 1062 to "corn4" 1064 define flare limit lines. The line from "corn1" 1054 to "corn4" 1064, including survey points "xyCCWIntStart" 1066 and "xyCWIntStart" 1068, is the intersection entrance, and the line from "corn2" 1056 to "corn3" 1062, including survey points "xyCWIntEnd" 1058 and "xyCCWIntEnd" 1060, is the intersection exit.

FIG. 18 provides an example of the "cut line" function at the function 890, (FIGS. 16a and 16b) used to separate a selected raster entity 1070 from an intersecting raster object 1074. A region 1078 is erased, or re-erased, after filling in intersecting areas, as in state 998 (FIG. 16b), such that no "on" pixels from the selected entity 1070 touch any "on" pixels from the intersecting object 1074, even diagonally.

It can thus be appreciated from the above description of the hybrid image editor that a great degree of flexibility is gained from maintaining raster and vector entities coextensively in a single image layer. That is, once a raster entity is vectorized, the user does not have to be conscious of the types of edit operations allowed on an entity since all types of vector operations may be applied. In addition, the selective recognition and conversion of raster entities to vector format can proceed across overlapping raster objects by the unique intersection crossing and gap jumping functions presented herein. Finally, the selective erasure of raster entities preserves intersecting raster objects, giving the user the illusion that the geometries of the raster entities do not "mix" and, hence, behave as if every entity is a vector entity.

While the above detailed description has shown, described, and pointed out, the fundamental novel features of the invention as applied to various embodiments, it will be understood that various omissions and substitutions and changes in the form and details of the illustrated invention may be made by those skilled in the art, without departing from the spirit of the invention.

What is claimed is:

1. A method of editing raster and vector entities in a computer having a processor, a memory and a visual display device, the method comprising the steps of:
   reading a prestored raster image from said memory wherein said raster image includes a composite of a plurality of binary codes representing pixels of said visual display device;
   storing said raster image in a display buffer portion of said memory;
   displaying said stored image on said visual display device;
   selecting a raster entity from among the displayed pixels of said raster image wherein said raster entity includes a plurality of pixels specified by absolute coordinates which define a geometric shape;
   selecting from among a list of predefined geometric shapes a predefined geometric shape that most closely resembles the selected raster entity;
   comparing a geometric equation determined by the pixel coordinates of the selected raster entity and a predefined canonical geometric equation of the selected predefined geometric shape to provide a geometric deviation;
   comparing the geometric deviation with a predefined minimum deviation so as to determinatively recognize the selected raster entity as having substantially the same geometric equation as the selected geometric shape;
   converting the selected raster entity into a vector entity corresponding to said selected geometric shape, wherein said vector entity includes a plurality of points having coordinates defined by relative displacements and slopes, so that said points of said vector entity are translated to absolute pixel coordinates and addressed and displayed on said visual display device using said display buffer; and
   processing said vector entity using a collection of vector edit operations so that said selected raster entity is manipulated as a vector entity which normally belongs to an image having only vector entities.

2. A method of editing as defined in claim 1, wherein said selecting is accomplished with an input device connected to said computer 3. A method of editing as defined in claim 2, wherein said input device is a mouse.

4. A method of selectively converting a raster entity, among a collection of raster entities in a visual display image stored in a memory of a computer, into a vector entity defined by a geometric equation of the form associated with a predefined geometric shape, the method comprising the steps of:
   selecting said predefined geometric shape from among a list of predefined geometric shapes;
   selecting a raster entity generally corresponding in shape to said selected predefined geometric shape from among said collection of raster entities;
   identify a locally line-like setment on said selected raster entity so that two ends of said line-like segment can be extended to determine the maximal spacial extent of said selected raster entity, said line-like segment defining two edges of said raster entity;
   extending at least one end of said line-like segment so that a geometric equation of the type corresponding to said selected predefined geometric shape can be fit from a set of points defined on said raster entity;
   comparing the deviation of said geometric equation for said raster entity with a maximum deviation so as to recognize said raster entity if said deviation is less than said maximum deviation;
   following one of the edges of said selected raster entity wherein said edge is extended in one direction defined by said edge by gathering a first set of edge pixels until a edge following deviation is identified;
   following an extrapolated edge of said selected raster entity beginning at a point beyond said edge following deviation by gathering a second set of edge pixels;
   merging said second set of edge pixels gathered from beyond said edge following deviation into said first set of edge pixels of said selected raster entity;
   converting said raster entity into a vector entity wherein said vector entity includes aset of survey points resulting from fitting reference line said edges of said raster entity; and storing said vector entity in a vector entity database.

5. The method of storing said vector entity into said memory of said computer, selectively converting a raster entity defined in claim 4, wherein said selecting a raster entity includes specifying a pixel in said visual display image that is near said raster entity.

6. The method of selectively converting a raster entity defined in claim 4, wherein the step of identifying a locally line-like segment comprises the steps of:
   gathering a third set of edge pixels along a selected edge of said raster entity;

searching perpendicular to said gathered edge pixels for an opposite edge of said raster entity, wherin the opposite edge is substantially parallel to the selected edge;

gathering a fourth set of edge pixels along said opposite edge; and fitting said substantially parallel edges to a comon reference line.

7. The method of selectively converting a raster entity defined in claim 4, wherein said edge following deviation is an intersection with another raster entity.

8. The method of selectively converting a raster entity defined in claim 7, wherein said following an extrapolated edge comprises the step of crossing said intersecting raster entity.

9. The method of selectively converting a raster entity defined in claim 4, wherein said edge following deviation is a pixel gap.

10. The method of selectively converting a raster entity defined in claim 9, wherein said following an extrapolated edge comprises the step of jumping over said pixel gap.

11. The method of selectively converting a raster entity defined in claim 4, wherein said edge following deviation is a bend in said raster entity.

12. The method of selectively converting a raster entity defined in claim 11, wherein said following an extrapolated edge comprises the step of turning around said bend.

13. The method of selectively converting a raster entity defined in claim 4, wherein said gathering of edge pixels is defined by a clockwise edge follower.

14. The method of selectively converting a raster entity defined in claim 4, wherein said gathering of edge pixels is defined by a counterclockwise edge follower.

15. A method of selectively erasing a vector entity from an overlapping raster entity wherein said raster entity overlaps said vector entity at an intersection zone in a visual display image, the method comprising the steps of:

bounding said intersection zone around said vector entity having one or more nonlinear pixel edge formations wherein said bounding is a quadrilateral boundary defined by a pair of flare limit lines that are substantially parallel to each other and to the local slope of the vector entity bounded by the quadrilateral, and by an intersection entrance line and an intersection exit line;

erasing said intersection zone by setting all pixels in said intersection zone to the background color of said visual display image;

extrapolating a line from points on said raster entity outside one of said flare limit lines to an intersection centerline to provide a centerline point wherein said intersection centerline is substantially parallel and equidistant from said flare limit lines;

correlating said extrapolation line with a set of points on said centerline corresponding to a set of extrapolated lines generated from a set of flares on an opposite side of said intersection zone; and filling a fill quadrilateral defined by two of said extrapolation lines, said intersection centerline, and one of said flare limit lines by setting all pixels in said fill quadrilateral to the color of said intersecting raster entity.

16. The method of selectively erasing a vector entity as defined in claim 11, wherein said step of correlating comprises the step of:

comparing the coordinates of said centerline point with said set of points on said centerline to determine the nearest point in said set of points.

17. A hybrid image editor for editing raster and vector entities in a computer having a processor, a memory and a visual display device, the hybrid image editor comprising:

means for reading a prestored raster image from said memory, wherein said raster image includes a composite of a plurality of binary codes representing pixels of said visual display device;

means for storing said raster image in a display buffer portion of said memory;

means for displaying said stored image on said visual display device;

means for selecting a raster entity from among the displayed pixels of said raster image wherein said raster entity includes a plurality of pixels specified by absolute coordinates which define a geometric shape;

means for selecting from among a list of predefined geometric shapes a predefined geometric shape that most closely resembles the selected raster entity;

means for comparing a geometric equation determined by the pixel coordinates of the selected raster entity and a predefined canonical geometric equation of the selected predefined geometric shape to provide a geometric deviation;

means for comparing the geometric deviation with a predefined minimum deviation so as to determinatively recognize the selected raster entity as having substantially the same geometric equation as the selected geometric shape;

means for converting the selected raster entity into a vector entity corresponding to said selected geometric shape, wherein said vector entity includes a plurality of points having coordinates defined by relative displacements and slopes, so that said points of said vector entity are translated to absolute pixel coordinates and addressed and displayed on said visual display device using said display buffer; and means for processing said vector entity using a collection of vector edit operations so that said selected raster entity is manipulated as a vector entity which normally belongs to an image having only vector entities.

18. A system for selectively converting a raster entity, among a collection of raster entities in a visual display image stored in a memory of a computer, into a vector entity defined by a geometric equation of the form associated with a predefined geometric shape, the system comprising:

means for selecting said predefined geometric shape from among a list of predefined geometric shapes;

means for selecting a raster entity generally corresponding in shape to said selected predefined geometric shape from among said collection of raster entities;

means for identifying a locally line-like segment on said selected raster entity so that two ends of said line-like segment can be extended to determine the maximal spacial extent of said selected raster entity;

means for extending at least one end of said line-like segment so that a geometric equation of the type corresponding to said selected predefined geometric shape can be fit from a set of points defined on said raster entity;

means for comparing the deviation of said geometric equation for said raster entity with a maximum deviation so as to recognize said raster entity if said deviation is less than said maximum deviation;

means for following one of the edges of said selected raster entity wherein said edge is extended in one direction defined by said edge by gathering a first set of edge pixels until an edge following deviation is identified;

means for following an extrapolated edge of said selected raster entity beginning at a point beyond said edge following deviation by gathering a second set of edge pixels;

means for merging said second set of edge pixels gathered from beyond said edge following deviation into said first set of edge pixels of said selected raster entity; and means for converting said raster entity into a vector entity wherein said vector entity includes a set of survey points lying on said reference line resulting from fitting said reference line from said edges of said raster entity.

19. A system for selectively erasing a vector entity from an overlapping raster entity wherein said raster entity overlaps said vector entity at an intersection zone in a visual display image, the system comprising:

means for bounding said intersection zone around said vector entity having one or more nonlinear pixel edge formations wherein said bounding is a quadrilateral boundary defined by a pair of flare limit lines that are substantially parallel to each other and to the local slope of the vector entity, and by an intersection entrance line and an intersection exit line;

means for erasing said intersection zone by setting all pixels in said intersection zone to the background color of said visual display image;

means for extrapolating a line from points on said raster entity outside one of said flare limit lines to an intersection centerline wherein said intersection centerline is substantially parallel and equidistant from said flare limit lines;

means for correlating said extrapolation line with pixels indicative of said raster entity, on an opposite side of said intersection zone; and means for filling a fill quadrilateral defined by two of said extrapolation lines, said intersection centerline, and one of said flare limit lines by setting all pixels in said fill quadrilateral to the color of said intersecting raster entity.

20. A hybrid image editor system for editing raster and vector entities with a common set of vector edit operations wherein said system includes a computer processor, a memory and a visual display device, said system comprising:

means for storing said raster and vector entities in a single image buffer of said memory, said single image buffer including:

a raster entity database;

a vector entity database; and means for coordinating the raster and vector entity databases;

means for converting a selected raster entity into a selected vector entity and thereafter storing said selected vector entity into said image buffer; and means for deleting said selected raster entity from said image buffer.

21. A system as defined in claim 20, wherein said deleting means retains in said image buffer raster entities that intersect said selected raster entity.

22. A method of editing digital images containing raster and vector entities, comprising the steps of:

converting a selected raster entity in a prestored raster entity database into a vector entity;

storing the vector entity into a vector database; and coordinating the raster and vector databases so that a plurality of raster and vector entities are displayed on a visual display device as a single image layer.

23. The method defined in claim 22, additionally comprising the step of:

editing the converted vector entity using a collection of vector edit operations wherein the edit operations are the same edit operations that are used to edit entities that are originally created as vector entities.

* * * * *

UNITED STATES PATENT AND TRADEMARK OFFICE
CERTIFICATE OF CORRECTION

PATENT NO. : 5,101,436

DATED : March 31, 1992

INVENTOR(S) : DeAguiar et al.

It is certified that error appears in the above-indentified patent and that said Letters Patent is hereby corrected as shown below:

Column 24, Line 27 reads

"identify a"

and should read

-- identifying a --

Column 24, Line 27 reads

"setment on"

and should read

-- segment on --

Column 24, Line 45 reads

"until a edge"

and should read

-- until an edge --

Column 24, Line 55 reads

"includes aset of"

and should read

-- includes a set of --

UNITED STATES PATENT AND TRADEMARK OFFICE
CERTIFICATE OF CORRECTION

PATENT NO. : 5,101,436

DATED : March 31, 1992

INVENTOR(S) : DeAguiar et al.

It is certified that error appears in the above-indentified patent and that said Letters Patent is hereby corrected as shown below:

Column 24, Line 56 reads

"fitting reference line said edges"

and should read

-- fitting said edges --

Claim 6

Column 25, Line 7 reads

"to a comon reference"

and should read

-- to a common reference --

Signed and Sealed this

Fourth Day of November, 1997

Attest:

BRUCE LEHMAN

Attesting Officer

Commissioner of Patents and Trademarks